United States Patent
Song et al.

(10) Patent No.: US 12,451,294 B2
(45) Date of Patent: Oct. 21, 2025

(54) MULTILAYER ELECTRONIC COMPONENT CONTAINING COATED CONDUCTIVE PARTICLES AND METHOD OF MANUFACTURING THE MULTILAYER ELECTRONIC COMPONENT

(71) Applicant: SAMSUNG ELECTRO-MECHANICS CO., LTD., Suwon-si (KR)

(72) Inventors: Young Ah Song, Suwon-si (KR); Bong Gyu Choi, Suwon-si (KR); Kwang Dong Seong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 80 days.

(21) Appl. No.: 17/980,880

(22) Filed: Nov. 4, 2022

(65) Prior Publication Data

US 2023/0207215 A1 Jun. 29, 2023

(30) Foreign Application Priority Data

Dec. 24, 2021 (KR) .................. 10-2021-0187672

(51) Int. Cl.
*H01G 4/30* (2006.01)
*H01G 4/012* (2006.01)
(Continued)

(52) U.S. Cl.
CPC ............ *H01G 4/30* (2013.01); *H01G 4/012* (2013.01); *H01G 4/1227* (2013.01); *H01B 1/22* (2013.01)

(58) Field of Classification Search
CPC ........ H01G 4/30; H01G 4/012; H01G 4/1227; H01G 4/2325; H01G 4/12; H01G 4/1209; H01G 4/005; H01G 4/008; H01B 1/22
See application file for complete search history.

(56) References Cited

U.S. PATENT DOCUMENTS 5,781,402 A * 7/1998 Fujiyama ............ C22C 32/0089
                                                          361/321.4
7,368,070 B2    5/2008 Akimoto et al.
(Continued)

FOREIGN PATENT DOCUMENTS

KR    10-2006-0045129 A    5/2006
KR    10-2012-0066944 A    6/2012
(Continued)

OTHER PUBLICATIONS

Office Action issued on Jul. 2, 2025 in the corresponding Korean Patent Application No. 10-2021-0187672 with English translation.

*Primary Examiner* — Timothy J. Dole
*Assistant Examiner* — Daniel M Dubuisson
(74) *Attorney, Agent, or Firm* — Morgan, Lewis & Bockius LLP

(57) ABSTRACT

A multilayer electronic component includes a body including a plurality of dielectric layers and internal electrodes disposed to oppose each other with the dielectric layers interposed therebetween; and external electrodes connected to the internal electrodes and including a plurality of conductive particles, wherein the plurality of conductive particles include first conductive particles, wherein the first conductive particles are plate-shaped conductive particles having a coating layer formed on a surface thereof, and wherein the coating layer includes Si, and an Si content is 0.3 at % or more and 2.0 at % or less, as compared to the plate-shaped conductive particles.

18 Claims, 20 Drawing Sheets

(51) Int. Cl.
*H01G 4/12* (2006.01)
*H01B 1/22* (2006.01)

(56) References Cited

U.S. PATENT DOCUMENTS

| | | | |
|---|---|---|---|
| 9,328,014 B2 | 5/2016 | Nishisaka et al. | |
| 2005/0219789 A1* | 10/2005 | Akimoto | H01G 4/2325 |
| | | | 361/306.1 |
| 2012/0154976 A1 | 6/2012 | Lee et al. | |
| 2013/0200749 A1* | 8/2013 | Nishisaka | H02N 2/00 |
| | | | 336/200 |
| 2014/0233147 A1* | 8/2014 | Hong | H01G 4/008 |
| | | | 361/301.4 |
| 2014/0240899 A1* | 8/2014 | Chung | H01G 4/258 |
| | | | 361/321.3 |
| 2014/0292142 A1* | 10/2014 | Nishisaka | C03C 8/18 |
| | | | 336/200 |
| 2015/0014900 A1 | 1/2015 | Lee et al. | |
| 2016/0203911 A1* | 7/2016 | Furusawa | B22F 1/16 |
| | | | 252/514 |
| 2016/0230026 A1* | 8/2016 | Furusawa | H01G 4/0085 |
| 2017/0301468 A1* | 10/2017 | Kim | H01G 4/30 |
| 2018/0286594 A1* | 10/2018 | Kim | H01G 4/248 |
| 2021/0057155 A1* | 2/2021 | Zenzai | H01G 4/008 |
| 2022/0406524 A1* | 12/2022 | Oh | H01G 4/232 |
| 2024/0249889 A1* | 7/2024 | Mishima | H01G 4/008 |

FOREIGN PATENT DOCUMENTS

| | | | | |
|---|---|---|---|---|
| KR | 10-1444613 B1 | 9/2014 | | |
| KR | 10-2014-0117295 A | 10/2014 | | |
| WO | WO-2013118892 A1 * | 8/2013 | | B22F 1/0062 |

\* cited by examiner

FIG. 14

MULTILAYER ELECTRONIC COMPONENT CONTAINING COATED CONDUCTIVE PARTICLES AND METHOD OF MANUFACTURING THE MULTILAYER ELECTRONIC COMPONENT

CROSS-REFERENCE TO RELATED APPLICATION(S)

This application claims benefit of priority to Korean Patent Application No. 10-2021-0187672 filed on Dec. 24, 2021 in the Korean Intellectual Property Office, the disclosure of which is incorporated herein by reference in its entirety.

BACKGROUND

1. Technical Field

The present disclosure relates to a multilayer electronic component and a method of manufacturing the same.

2. Description of Related Art

A multilayer electronic component (MLCC), which is one of multilayer electronic components, may be a chip-type condenser mounted on a printed circuit board of various electronic products such as imaging devices such as a liquid crystal display (LCD) and a plasma display panel (PDP), a computer, a smartphone, and a mobile phone and charging or discharging electricity.

Such a multilayer ceramic capacitor may be used as a component of various electronic devices as a multilayer ceramic capacitor may have a small size and high capacitance thereof and may be easily mounted.

To meet the demand for miniaturization and high capacitance of a multilayer electronic component, an external electrode of a multilayer electronic component has also been designed to have a reduced thickness. To form an external electrode, a paste for an external electrode may be prepared by mixing conductive metal particles, glass, and an organic solvent, and the paste for an external electrode may be applied to both end surfaces of a ceramic body and may be sintered.

However, since viscosity of the paste for an external electrode is high, it may be difficult to lower the application thickness below a predetermined level, and when viscosity of the paste is lowered, the issue of phase stability may occur, and it may be difficult to reduce a size of conductive particles used in the paste for an external electrode.

Also, in the case of reducing the thickness of the external electrode by reducing the size of conductive particles for reducing the thickness of the external electrode or by applying the paste for an external electrode by a reduced thickness, there may be the issue in that contact properties with an internal electrode may be deteriorated, and due to the external electrode having a thin thickness, a structure may become vulnerable to external physical and chemical impacts, and mechanical strength may be lowered.

Also, a thickness of a corner of the external electrode may decrease due to sintering reduction occurring during a sintering process, such that coverage of the chip may be significantly weakened. For this reason, the corner may be peeled off after plating, which may cause a reliability issue.

SUMMARY

An example embodiment of the present disclosure is to provide an external electrode formed uniformly by controlling sintering reduction of conductive particles.

An example embodiment of the present disclosure is to provide a multilayer electronic component having high reliability, a reduced size, and high capacitance by addressing corner coverage, plating coverage, and Si aggregation.

According to an example embodiment of the present disclosure, a multilayer electronic component includes a body including a plurality of dielectric layers, and internal electrodes disposed to oppose each other with the dielectric layers interposed therebetween; and external electrodes connected to the internal electrodes and including a plurality of conductive particles, wherein the plurality of conductive particles include first conductive particles, wherein the first conductive particles are plate-shaped conductive particles having a coating layer disposed on a surface thereof, and wherein the coating layer includes Si, and an Si content is 0.3 at % or more and 2.0 at % or less, as compared to the plate-shaped conductive particles.

According to another example embodiment of the present disclosure, a method of manufacturing a multilayer electronic component includes preparing a body including a plurality of dielectric layers, and internal electrodes disposed to oppose each other with the dielectric layers interposed therebetween; and preparing an external electrode connected to the internal electrodes and including a plurality of conductive particles, wherein the plurality of conductive particles include first conductive particles, wherein the first conductive particles are plate-shaped conductive particles having a Si—Al coating layer disposed on a surface thereof, and are one or more selected from a group consisting of copper (Cu), silver (Ag), nickel (Ni), and alloys thereof, and wherein a Si content of the Si—Al coating layer is 0.3 at % or more and 2.0 at % or less, as compared to the plate-shaped conductive particles after the preparing of the external electrode.

According to another example embodiment of the present disclosure, a multilayer electronic component includes a body including a plurality of dielectric layers, and internal electrodes disposed to oppose each other with the dielectric layers interposed therebetween; and external electrodes connected to the internal electrodes and including a plurality of conductive particles, wherein the plurality of conductive particles include first conductive particles, wherein the first conductive particles are plate-shaped conductive particles having a coating layer disposed on a surface thereof, and wherein the coating layer includes Al and Si.

BRIEF DESCRIPTION OF DRAWINGS

The above and other aspects, features, and advantages of the present disclosure will be more clearly understood from the following detailed description, taken in combination with the accompanying drawings, in which:

FIG. 14 is an SEM-EDS mapping image of plate-shaped Cu particles, on which a coating layer was formed by varying Si content, manufactured as a paste.

DETAILED DESCRIPTION

Figure 1:
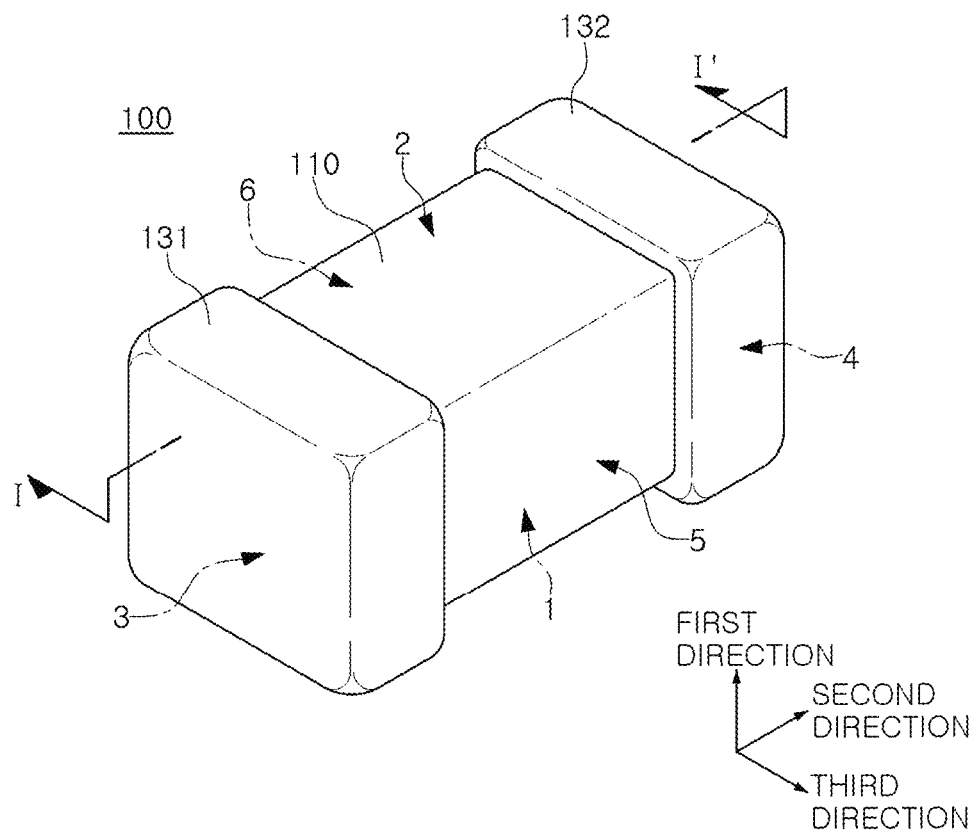
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
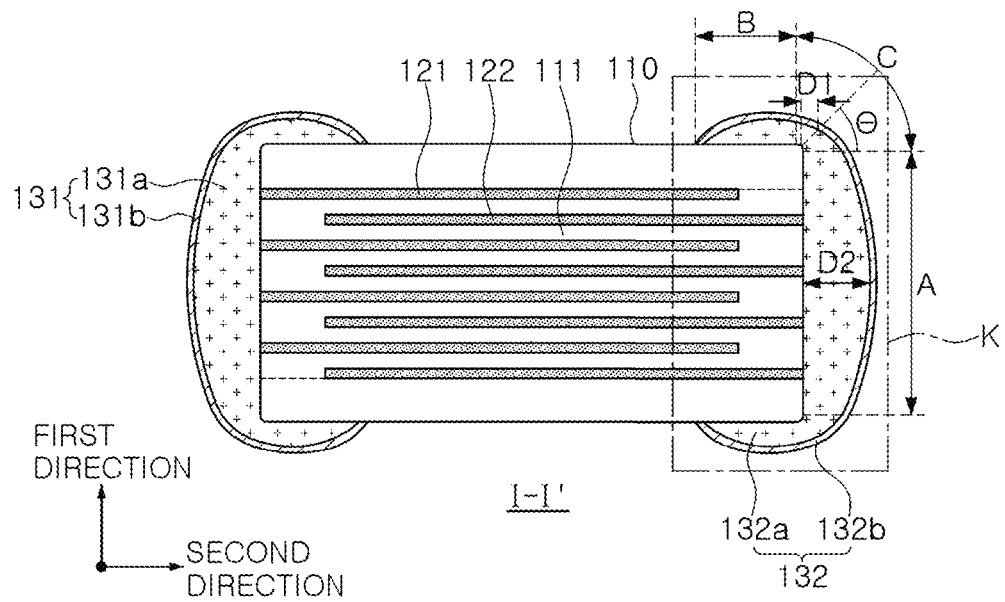
FIG. 2 is a cross-sectional diagram taken along line I-I' in FIG. 1.

FIG. 2 is a cross-sectional diagram taken along line I-I' in FIG. 1.

Hereinafter, a multilayer electronic component according to an example embodiment will be described in greater detail with reference to FIGS. 1 and 2.

A multilayer electronic component 100 may include a body including a plurality of dielectric layers 111 and internal electrodes 121 and 122 disposed to oppose each other with the dielectric layers 111 interposed therebetween, and external electrodes 131 and 132 connected to the internal electrodes 121 and 122 and including a plurality of conductive particles, and the plurality of conductive particles may include first conductive particles 141, the first conductive particles 141 may include plate-shaped conductive particles 141a having a coating layer 141b formed on a surface thereof, and the coating layer 141b may include Si, and the Si content is 0.3 at % or more and 2.0 at % or less, as compared to the plate-shaped conductive particles 141a.

The body 110 may include a plurality of dielectric layers 111 and internal electrodes 121 and 122 disposed to oppose each other with the dielectric layers 111 interposed therebetween.

The shape of the body 110 may not be limited to any particular shape, but as illustrated, the body 110 may have a hexahedral shape or a shape similar thereto. Due to reduction of ceramic powder included in the body 110 during a firing process, the body 110 may not have an exact hexahedral shape formed with linear lines, but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

A raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

Meanwhile, the thickness td of each of the dielectric layer 111 may not be limited to any particular example. However, to easily implement a reduced size and high capacitance of the multilayer electronic component 100, the thickness td of the dielectric layer 111 may be 0.4 µm or less. Here, the thickness td of the dielectric layer 111 may refer to an average thickness of the dielectric layer 111.

The average thickness of the dielectric layer 111 may be measured by scanning a cross-section of the body 110 in the length and thickness direction (L-T) using a scanning electron microscope (SEM) with a magnification of 10,000×. More specifically, an average value may be measured from the thicknesses of the dielectric layer 111 at 30 points spaced apart by an equal distance in the length direction in the scanned image. The 30 points at equal distances may be designated in the active portion Ac. Also, when the average value is measured by extending the measurement of the average value to ten dielectric layers 111, the average thickness of the dielectric layer 111 may be further generalized.

The body 110 may include internal electrodes 121 and 122 disposed therein and disposed to oppose each other with the dielectric layer 111 interposed therebetween.

Also, the internal electrodes 121 and 122 may include an active portion Ac for forming capacitance including the first internal electrode 121 and the second internal electrode 122. That is, the body 110 may be formed by alternately laminating the dielectric layers 111 on which the first internal electrodes 121 are printed and the dielectric layers 111 on which the second internal electrodes 122 are printed in the first direction, and sintering the layers.

The first internal electrode 121 may be spaced apart from the fourth surface 4 and may be exposed through the third surface 3, and the second internal electrode 122 may be spaced apart from the third surface 3 and may be exposed through the fourth surface 4. Also, the first internal electrode 121 may be exposed through the third, fifth, and sixth surfaces 3, 5, and 6. In this case, the first and second internal electrodes 121 and 122 may be electrically isolated from each other by the dielectric layer 111 disposed therebetween.

Accordingly, when a predetermined voltage is applied to the first and second external electrodes 131 and 132, electric charges may be accumulated between the first and second internal electrodes 121 and 122. In this case, capacitance of the multilayer electronic component 100 may be proportional to an area of overlap between the first and second internal electrodes 121 and 122 overlapping each other in the first direction in the active portion.

The material for forming the internal electrodes 121 and 122 is not limited to any particular example, and may include, for example, nickel (Ni), copper (Cu), palladium (Pd), silver (Ag), gold (Au), platinum (Pt), tin (Sn), tungsten (W), titanium (Ti), and alloys thereof, and the internal electrodes 121 and 122 may be formed using a conductive paste.

Meanwhile, the thickness te of each of the internal electrodes 121 and 122 may not need to be limited to any particular example. However, to easily implement miniaturization and high capacitance of the multilayer electronic component 100, the thickness te of each of the internal electrodes 121 and 122 may be 0.4 µm or less. Here, the thickness te of the internal electrodes 121 and 122 may refer to an average thickness of the internal electrodes 121 and 122.

The thickness of the internal electrodes 121 and 122 may be measured by scanning a cross-section of the body 110 in the length and thickness direction (L-T) using a scanning electron microscope (SEM) with a magnification of 10,000×. An average thickness may be obtained by averaging the thicknesses of one internal electrode at 30 points spaced apart by an equal distance in the length direction in the scanned image. The 30 points at equal distances may be designated in the active portion Ac. The average value may also be obtained by averaging the thicknesses of ten internal electrodes.

The body 110 may include cover portions formed on upper and lower portions of the active portion Ac. The upper cover portion and the lower cover portion may not include internal electrodes, may be formed of the same material as that of the dielectric layer, and may prevent damage to the internal electrodes 121 and 122 due to physical or chemical stress. The upper cover portion and the lower cover portion may be formed by laminating a single dielectric layer or two or more dielectric layers on upper and lower surfaces of the active portion in the vertical direction, respectively.

Also, a margin portion may be disposed on both end surfaces 5 and 6 of the active portion Ac in the third direction.

The margin portion may include a first margin portion disposed on the fifth surface 5 of the body 110 and a second margin portion disposed on the sixth surface 6.

To prevent a step difference caused by the internal electrodes 121 and 122, the margin portion may be formed by cutting such that the internal electrodes 121 and 122 are exposed to the fifth and sixth surfaces 5 and 6 of the body 110 after lamination, and laminating a single dielectric layer 111 or two or more dielectric layers 111 on both end surfaces 5 and 6 of the active portion Ac, taken in the third direction, in the third direction, and the margin portion may prevent damage to the internal electrodes 121 and 122 due to physical or chemical stress.

The margin portion may not include the internal electrodes 121 and 122 and may include the same material as that of the dielectric layer 111. That is, the margin portions may include a ceramic material, such as, for example, a barium titanate ($BaTiO_3$) ceramic material.

The width of the margin portion may not need to be limited to any particular example. However, to easily implement miniaturization and high capacitance of the multilayer electronic component and to increase the capacitance per unit volume, the average width of the margin may be 20 µm or less.

The width of the margin portion may refer to a size in the first direction, and may be a value obtained by averaging the sizes of the margin portion in the first direction measured at five points spaced apart by an equal distance in an upper portion and a lower portion of the active portion Ac.

The external electrodes 131 and 132 may be disposed on an external region of the body 110, may be connected to the internal electrodes 121 and 122, and may be disposed on the third and fourth surfaces 3 and 4 of the body 110.

The external electrodes 131 and 132 may include a first external electrode 131 and a second external electrode 132 connected to the first and second internal electrodes 121 and 122, respectively. More specifically, the external electrode may include a first external electrode 131 disposed on the third surface 3 of the body 110 and a second external electrode 132 disposed on the fourth surface 4 of the body 110. In this case, the second external electrode 132 may be connected to a potential different from that of the first external electrode 131.

In the example embodiments, the multilayer electronic component 100 may have two external electrodes 131 and 132, but the number or shape of the external electrodes 131 and 132 may be varied by the shape of the internal electrodes 121 and 122 or other purposes.

The external electrodes 131 and 132 may be formed using any material having electrical conductivity, such as a metal, and specific materials may be determined in consideration of electrical properties and structural stability, and may further have a multilayer structure.

The external electrodes 131 and 132 may include a plurality of conductive particles, the plurality of conductive particles may include first conductive particles 141, and the first conductive particles 141 may be plate-shaped conductive particles 141a having a coating layer 141b formed on a surface thereof. In some embodiments, an average major axis diameter of the plate-shaped conductive particles 141a may be 0.1 µm or more and 10 µm or less. A length ratio (major axis diameter/minor axis diameter) between a major axis diameter and a minor axis diameter may be 2.0 or more. The major and minor axes diameters of the plate-shaped conductive particles 141a may be measured using an electron microscope. Other methods and/or tools appreciated by one of ordinary skill in the art, even if not described in the present disclosure, may also be used.

The plurality of conductive particles may provide conductivity to the external electrodes 131 and 132, such that, when the multilayer electronic component 100 is mounted on a printed circuit board and is connected to the electrode pad, a voltage may be received therefrom and may be transferred to the internal electrodes 121 and 122.

The conductive particles included in the external electrode 131 and 132 layer may use one or more selected from a group consisting of copper (Cu), silver (Ag), nickel (Ni), which are materials having excellent electrical conductivity, and alloys thereof, but an example embodiment thereof is not limited thereto.

Figure 3A:
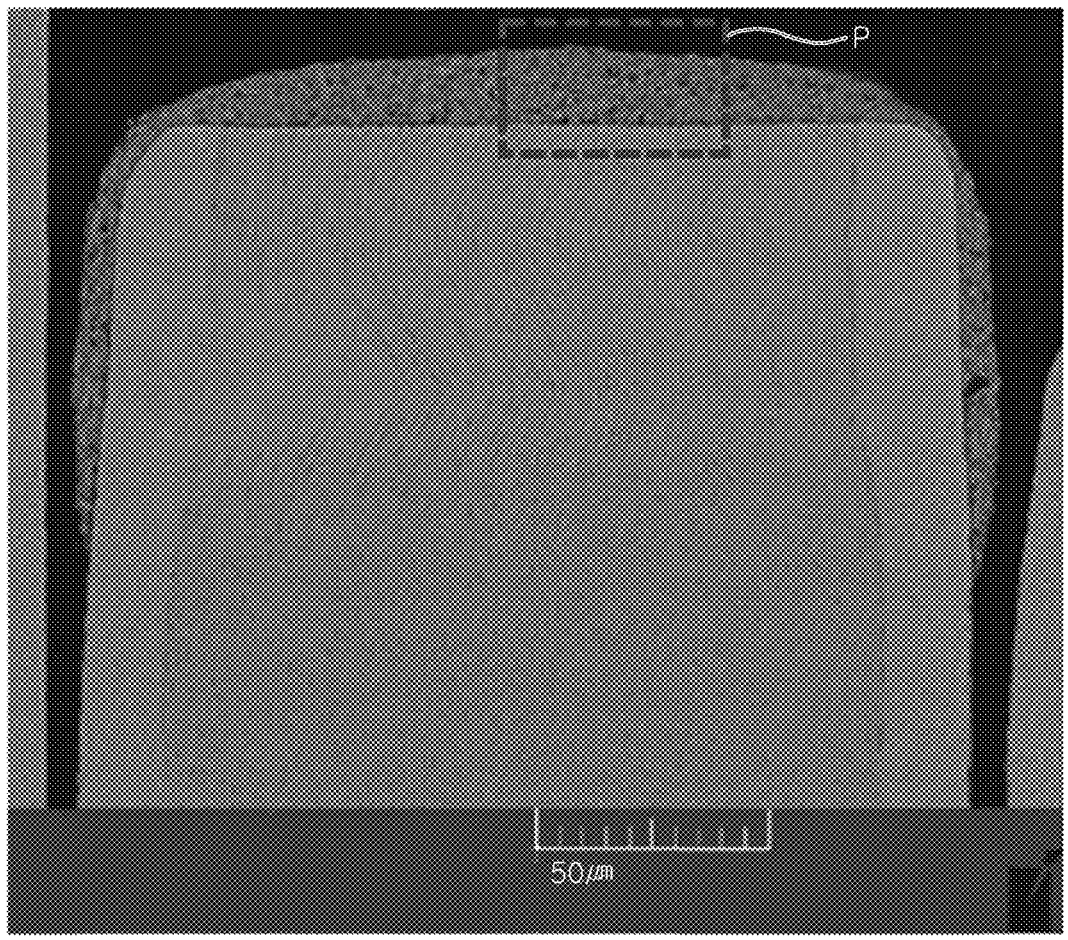
FIG. 3A is an SEM image of region (K) in FIG. 2.
Figure 3B:
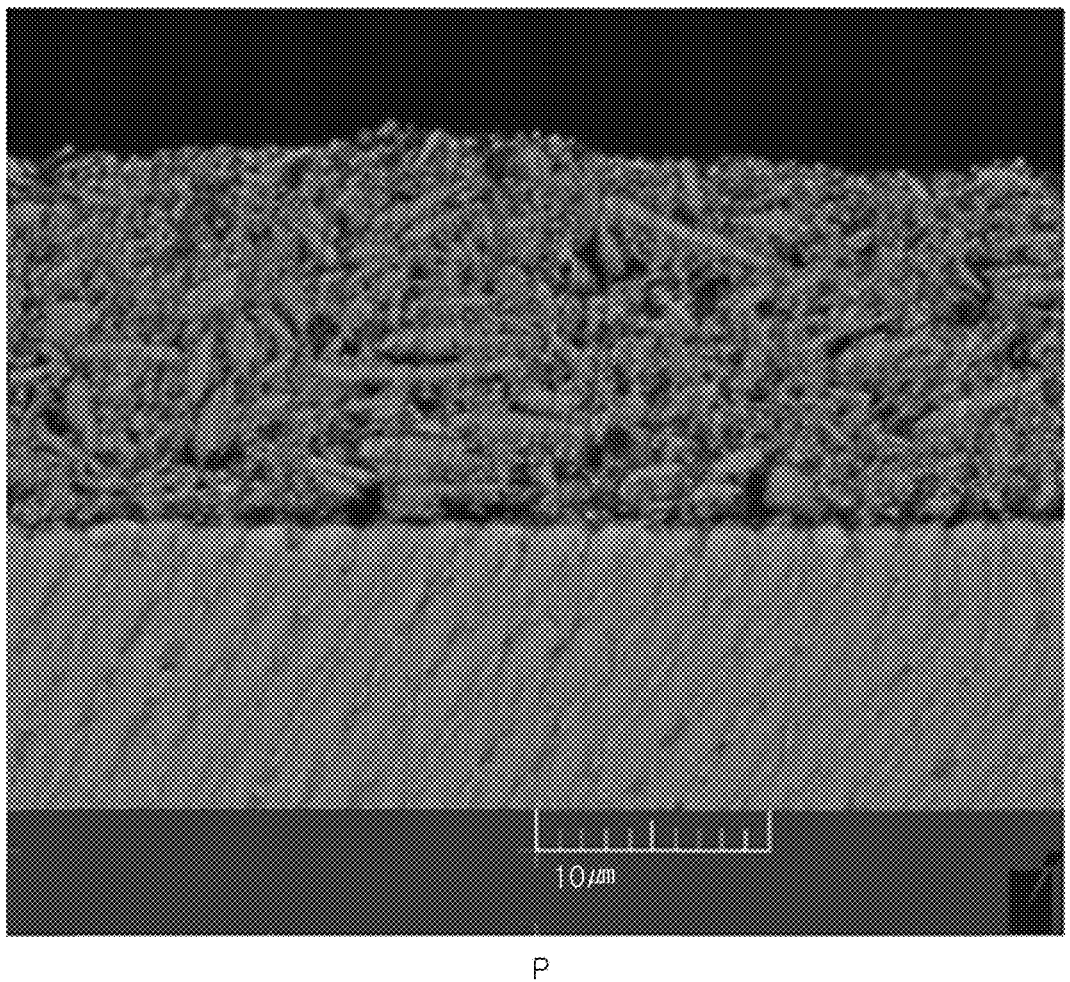
FIG. 3B is an enlarged image of a portion of region (P) illustrated in FIG. 3A.

Referring to FIGS. 3A and 3B, the plate-shape may refer to a flake shape. Different from a spherical shape, a flake shape may refer to a structure having a constant thickness and having substantially flat upper and lower surfaces.

When the plate-shaped conductive particles are laminated on the corners of the multilayer electronic component 100 and form an external electrode, a filling rate of the corner portions C of the external electrodes 131 and 132 may be increased as compared to the example in which only spherical conductive particles are accumulated at the corners.

Also, the coating layer 141b may include Si, and the Si content may be 0.3 at % or more and 2.0 at % or less, as compared to the plate-shaped conductive particles 141a. In this case, the coating layer 141b may further include Al, and the average thickness of the coating layer 141b may be 15 nm or more and 60 nm or less.

Generally, a heat treatment process for the external electrodes 131 and 132 of the multilayer electronic component 100 may be performed in the range of 600° C. to 900° C., but in the case of the multilayer electronic component 100 having a size of 0402 (length×width, 0.4 mm×0.2 mm), a heat treatment process may be performed at 700° C. to 750° C. However, the temperature of the heat treatment process is not limited thereto.

Figure 4A:
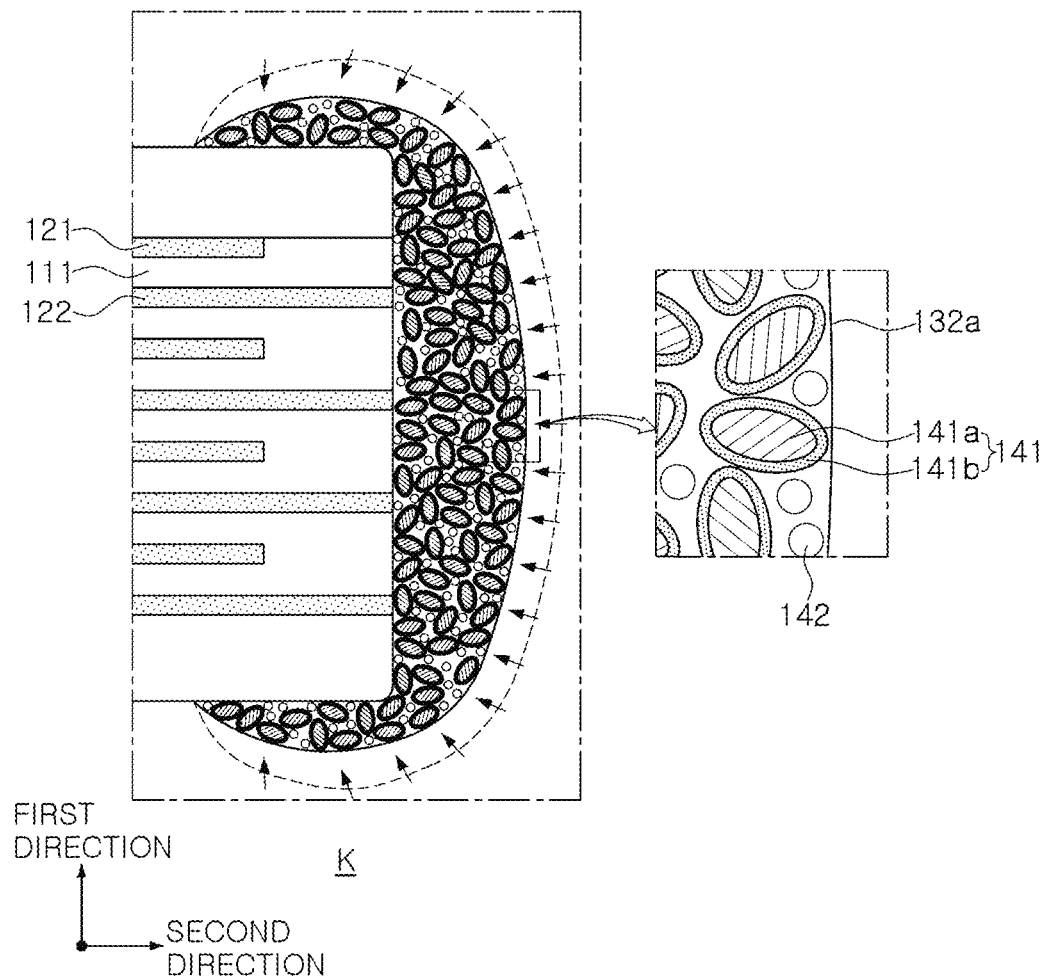
FIG. 4A is an enlarged diagram illustrating region (K) in FIG. 2 excluding a plating layer.
Figure 4B:
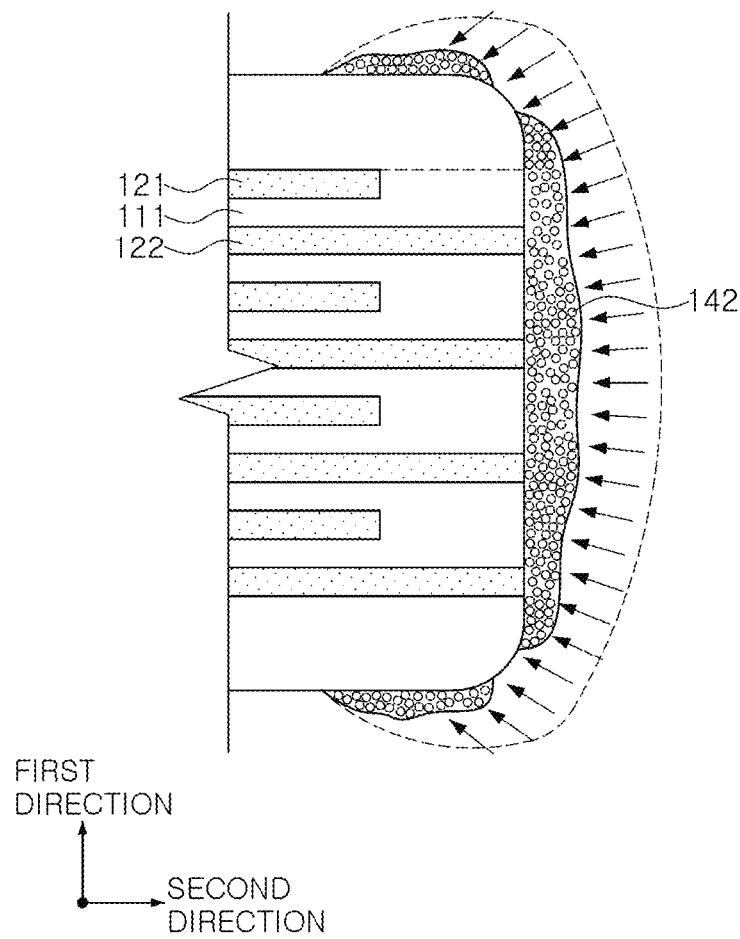
FIG. 4B is a diagram illustrating region (K) of an example of a multilayer electronic component in which a coating layer is not formed.

Referring to FIGS. 4A and 4B, by including Si in the coating layer 141b, there may be a sintering delay effect, and as the reduction rate between the first conductive particles 141 decreases during the heat treatment process, the reduction rate of the paste for an electrode may also be reduced. Accordingly, the corner portion C of the external electrodes 131 and 132 may not break, and the body 110 may not be exposed. Also, when the plating layers 131b and 132b are formed, plating breakage may be prevented.

For example, as shown in FIG. 4B, when Cu particles are used as conductive particles, the thickness of the external electrodes 131 and 132 may be reduced due to necking between Cu—Cu particles or reduction of the paste during the heat treatment process. Particularly, in the case of applying the external electrode paste or performing dipping in the vertical direction and performing drying or firing, the thickness D1 of the corner portion C of the external electrodes 131 and 132 may be relatively thin, such that plating breakage may occur or the body 110 may be exposed. In this case, when a paste including Cu particles on which the Si coating layer 141b is formed is manufactured and heat-treated, necking between Cu—Cu particles or reduction may be prevented, thereby reducing the reduction rate of the first conductive particles, and the reduction rate of the paste may also be reduced. Accordingly, the degree of breakage of the electrode or plating may be addressed.

When the Si content is less than 0.3 at %, the conductive particles may not be completely coated, such that the sintering delay effect may be insignificant, and the corner portion C of the multilayer electronic component 100 may be exposed, such that corner coverage may be insufficient and the body 110 may be exposed, and plating coverage may be insufficient, such as plating breakage. When the Si content is more than 2.0 at %, dispersibility of the conductive particles may be deteriorated due to Si aggregation when preparing the paste for the external electrodes 131 and 132. The Si content may be based on a total of 100 at % for Cu and O, and may be determined using Electron Probe Micro-Analyzer (EPMA/EDS). Other methods and/or tools appreciated by one of ordinary skill in the art, even if not described in the present disclosure, may also be used.

Also, by further including Al in the coating layer 141b, the Si—Al alloy coating layer may be formed on the plate-shaped conductive particles 141a and may form the first conductive particles 141. An Si—Al alloy may have properties such as low coefficient of thermal expansion, high thermal conductivity, excellent electrical conductivity, and excellent thermodynamic stability.

Figure 5A:
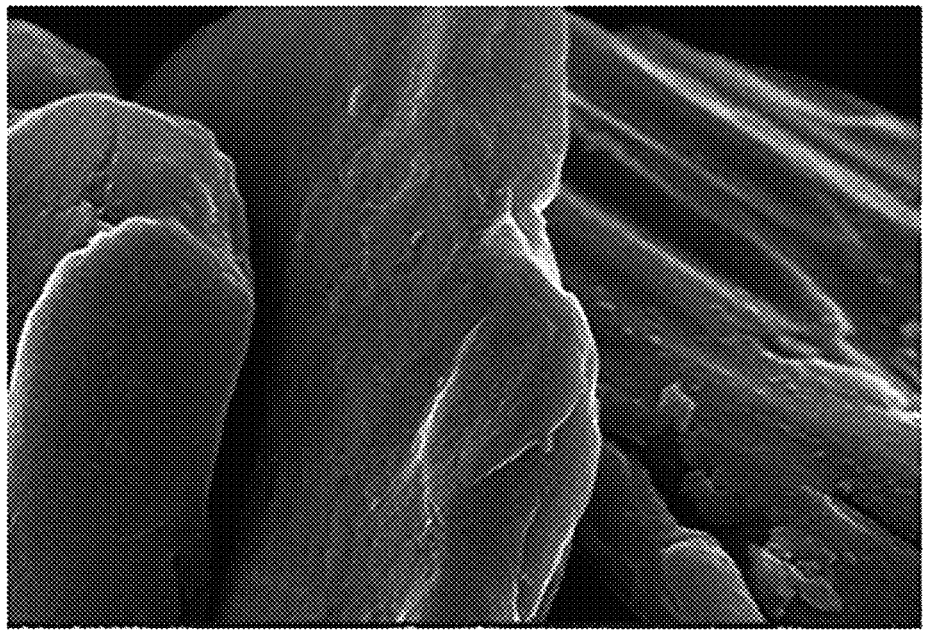
FIG. 5A is an SEM image of plate-shaped Cu particles conductive particles on which an Si—Al coating layer is not formed.
Figure 5B:
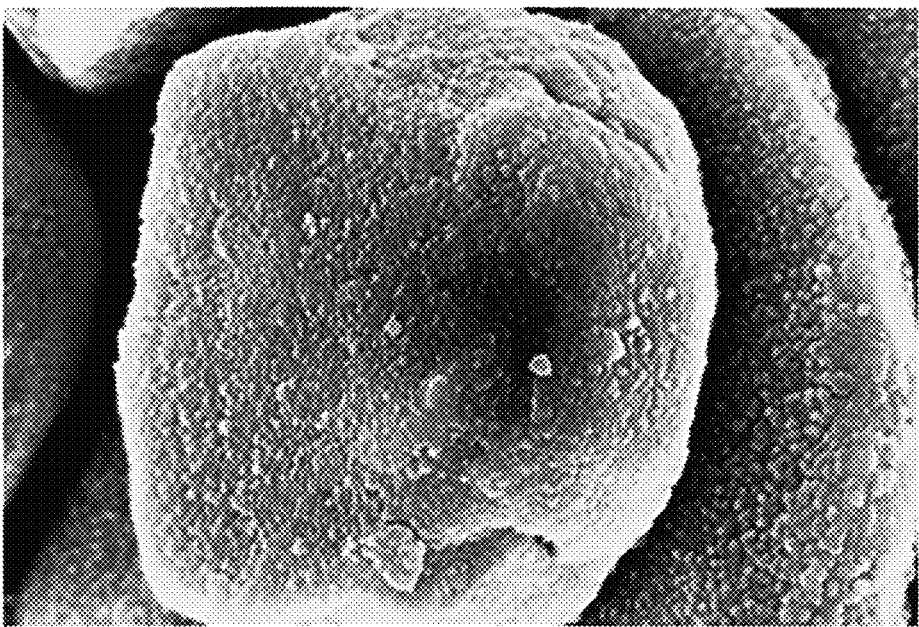
FIG. 5B is an SEM image of plate-shaped Cu particles conductive particles on which an Si—Al coating layer is formed.
Figure 5C:
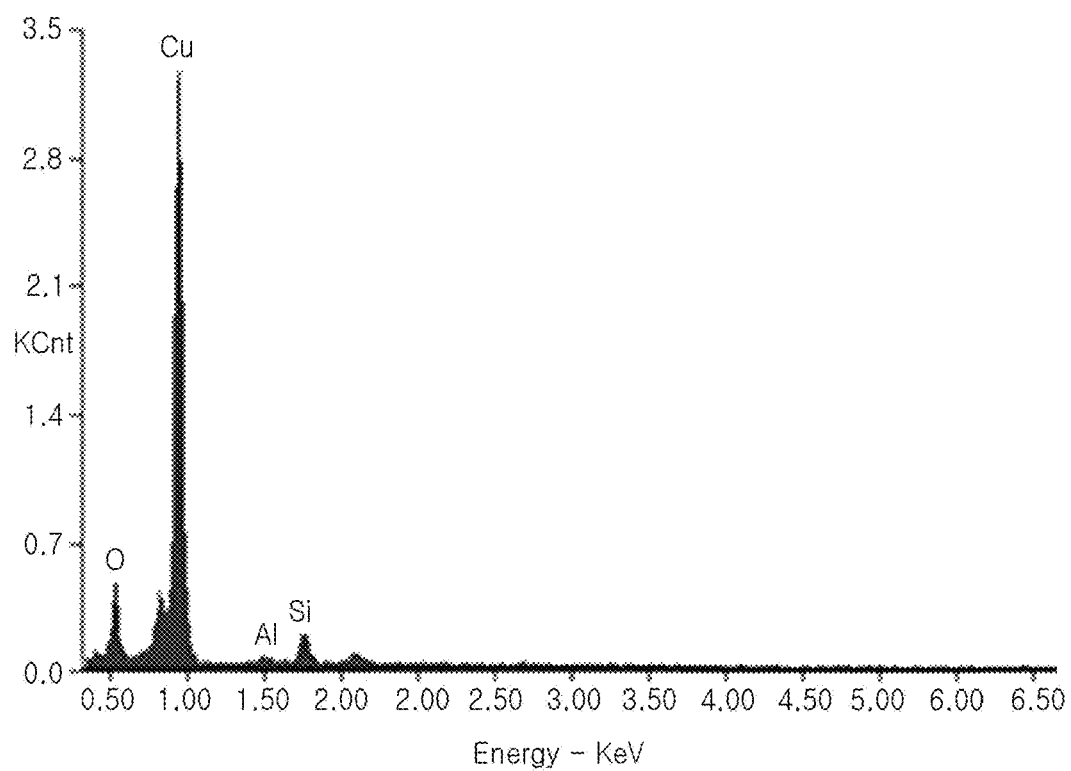
FIG. 5C is a result of analyzing plate-shaped Cu particles conductive particles, on which an Si—Al coating layer is formed, using a SEM-EDS device.

Referring to FIGS. 5A to 5C, FIG. 5A is an SEM image of Cu plate-shaped conductive particles on which an Si—Al coating layer is not formed, FIG. 5B is an SEM image of Cu plate-shaped conductive particles on which an Si—Al coating layer is formed, and FIG. 5C is a result of analyzing Cu plate-shaped conductive particles, on which an Si—Al coating layer is formed, using an energy dispersive X-ray spectroscope (SEM-EDS) device. Referring to FIG. 5C, since Si and Al were included in addition to Cu, it may be confirmed that the Si—Al coating layer was formed.

Figure 6A:
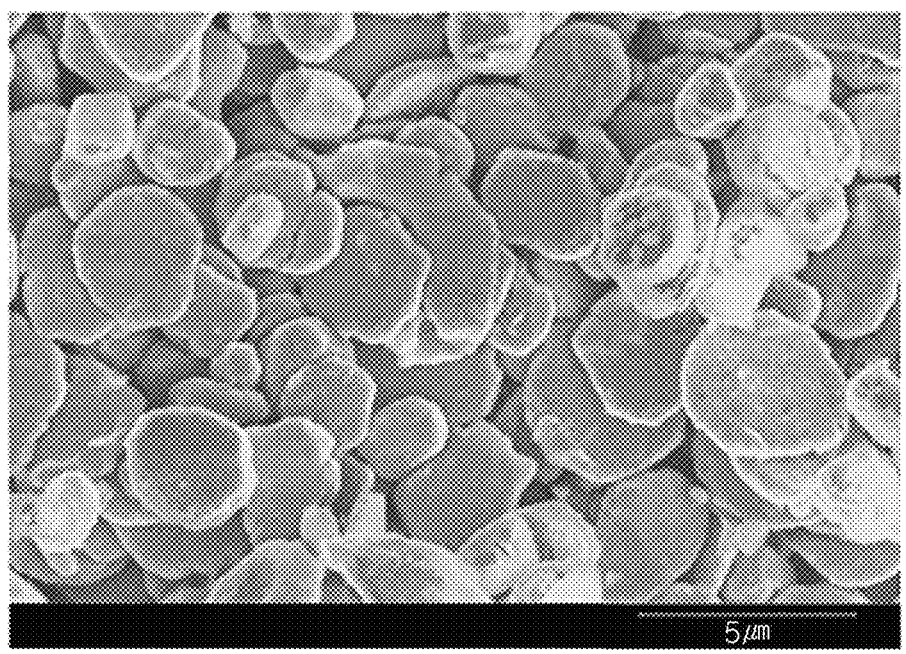
FIG. 6A is an SEM image of plate-shaped conductive particles on which a coating layer is formed.
Figure 6B:
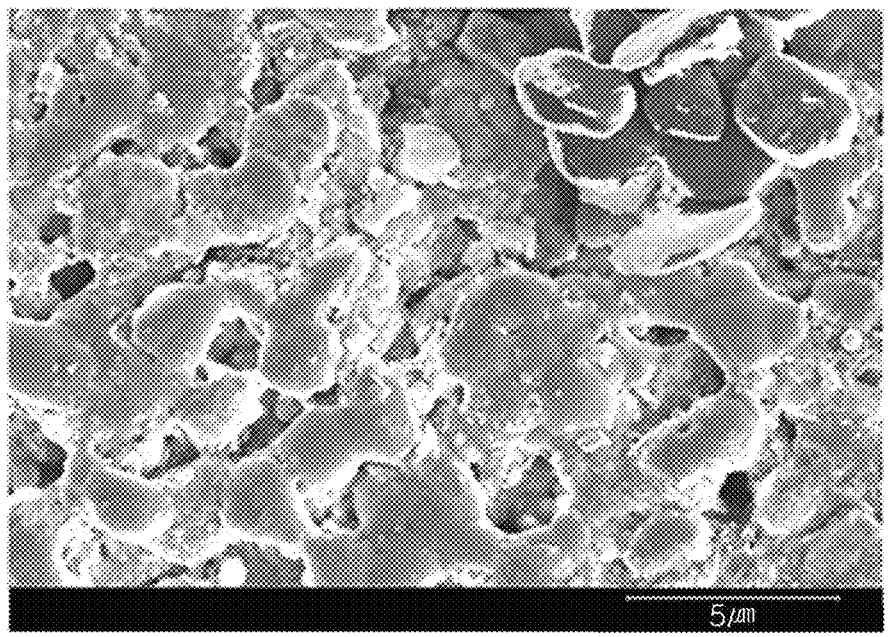
FIG. 6B is an SEM image of plate-shaped conductive particles on which a coating layer is not formed.

Referring to FIGS. 6A and 6B, FIG. 6A is an SEM image after a heat treatment of plate-shaped Cu conductive particles on which a Si—Al coating layer is formed at 730° C. for 1 hour, and FIG. 6B is an SEM image after a heat treatment of plate-shaped Cu conductive particles on which a Si—Al coating layer is not formed at 730° C. for 1 hour. Referring to the diagrams, it may be confirmed that necking or aggregation hardly occurred between Cu particles on which the coating layer is formed, and that necking occurred between Cu particles on which the coating layer is not formed. That is, when the Si—Al coating layer is formed on the surface of Cu particles, necking between Cu particles may be prevented such that the sintering delay effect may be obtained.

Also, the coating layer 141b may have a shape in which a thickness is varied. That is, the coating layer 141b may not have a uniform thickness on the surface of the conductive particles, and may be coated at a thick thickness on a specific portion and may be coated at a thin thickness on another specific portion.

In this case, the thickness of the coating layer 141b may be gradually changed from the thickest portion to the thinnest point. That is, the coating layer 141b may be formed to have a thickness gradually increasing from the point at which the coating is thinnest at the point at which the coating is thickest. In other words, when the plurality of conductive particles on which the coating layer 141b is formed is viewed in a cross-section cut to pass through the center of the conductive particles, the conductive particles may not be located in the center of the coating layer 141b but may be spaced apart from the center in one direction.

When the average thickness of the coating layer 141b is less than 15 nm, a portion of the coating layer 141b may melt during the heat treatment process such that the necking between the conductive particles may actively occur, which may be problematic, and when the average thickness of the coating layer 141b is more than 60 nm, electrical connectivity between the conductive particles in the external electrodes 131 and 132 may be reduced, and the ratio of conductive particles in the external electrodes 131 and 132 may be reduced, such that electrical connection with the internal electrodes 121 and 122 may be broken. The average thickness of the coating layer 141b may be measured using an electron microscope. Other methods and/or tools appreciated by one of ordinary skill in the art, even if not described in the present disclosure, may also be used.

Figure 7A:
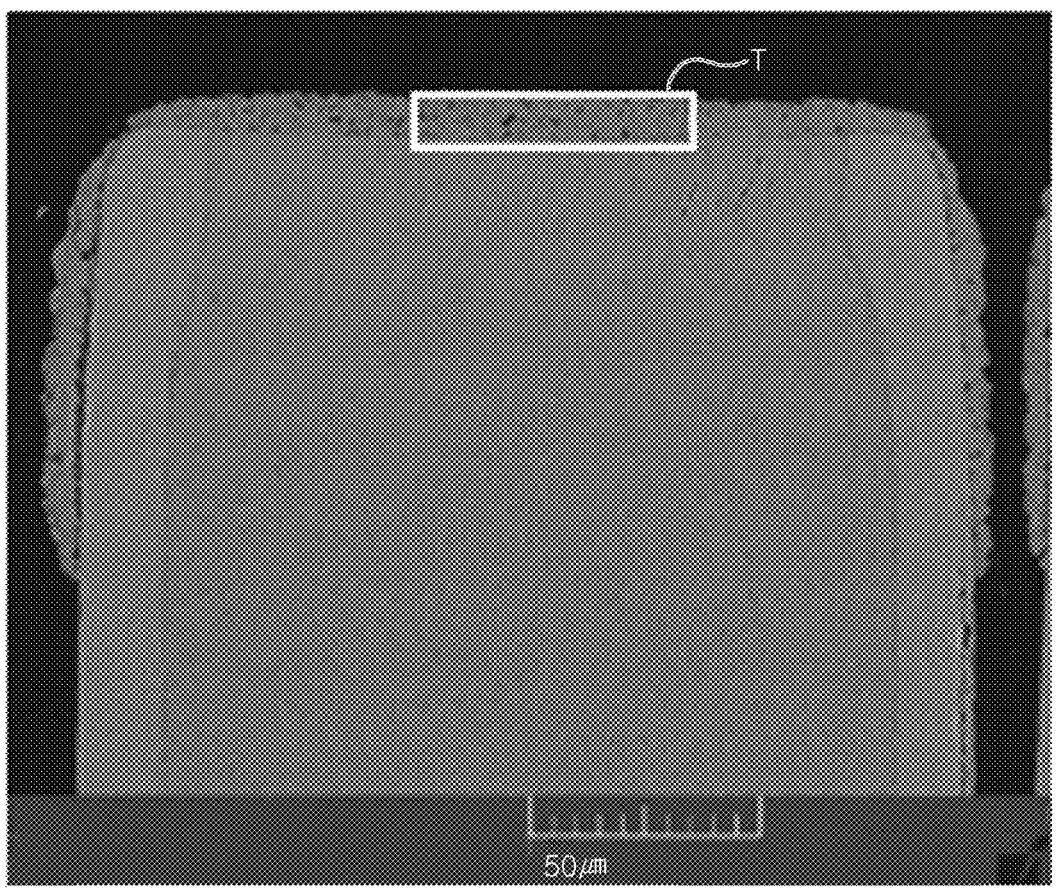
FIG. 7A is an SEM image of region (K) in FIG. 2.
Figure 7B:
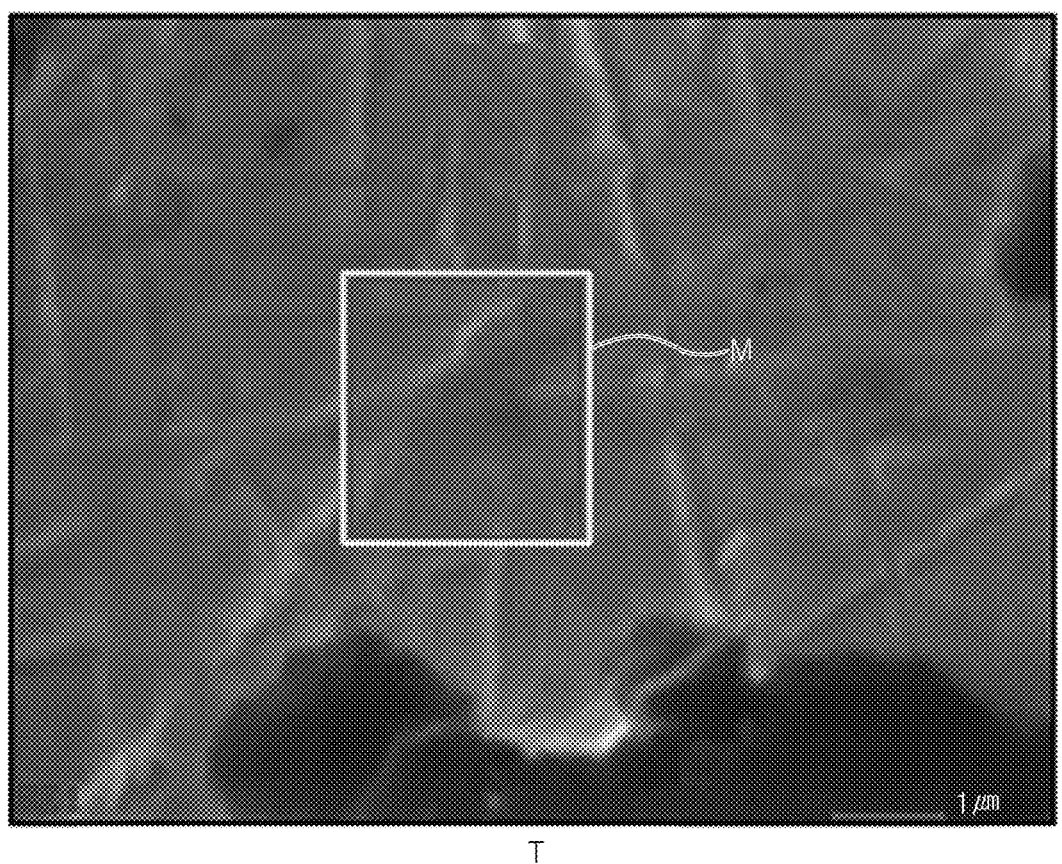
FIG. 7B is an enlarged SEM image of a portion of region (T) illustrated in FIG. 7A.
Figure 8A:
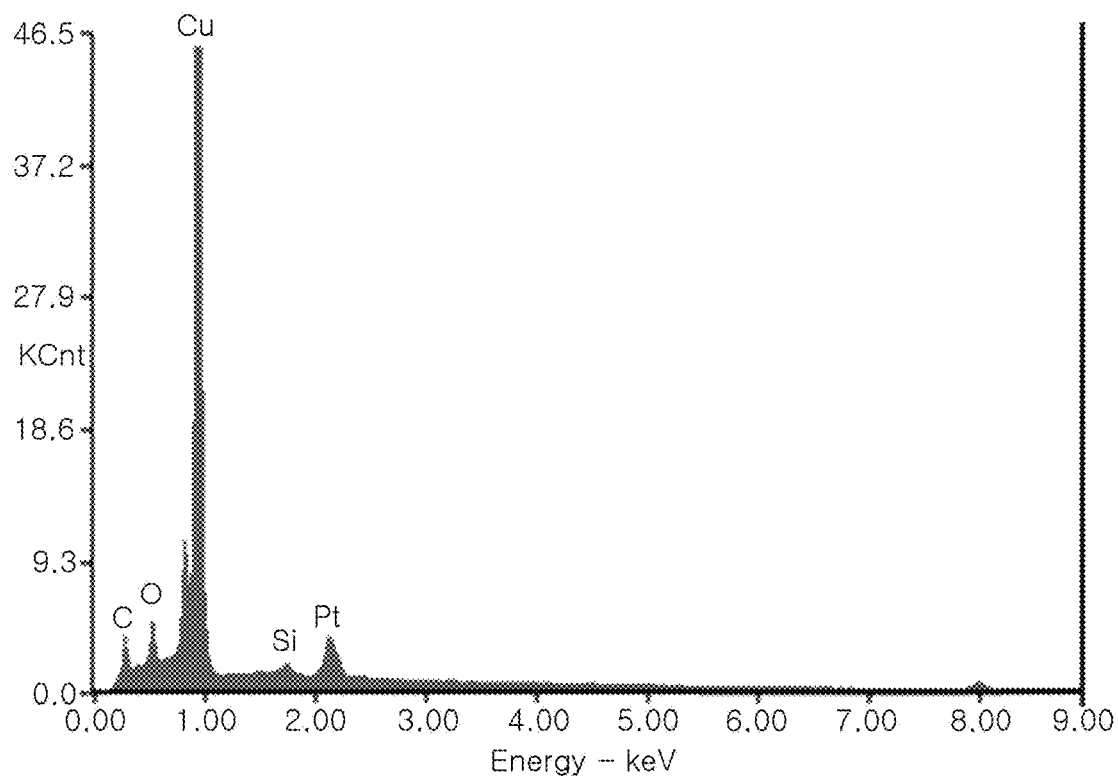
FIG. 8A is a result of SEM-EDS analysis of region (M) of an external electrode including plate-shaped Cu particles, on which an Si—Al coating layer is formed, illustrated in FIG. 7B, and the region does not include glass.
Figure 8B:
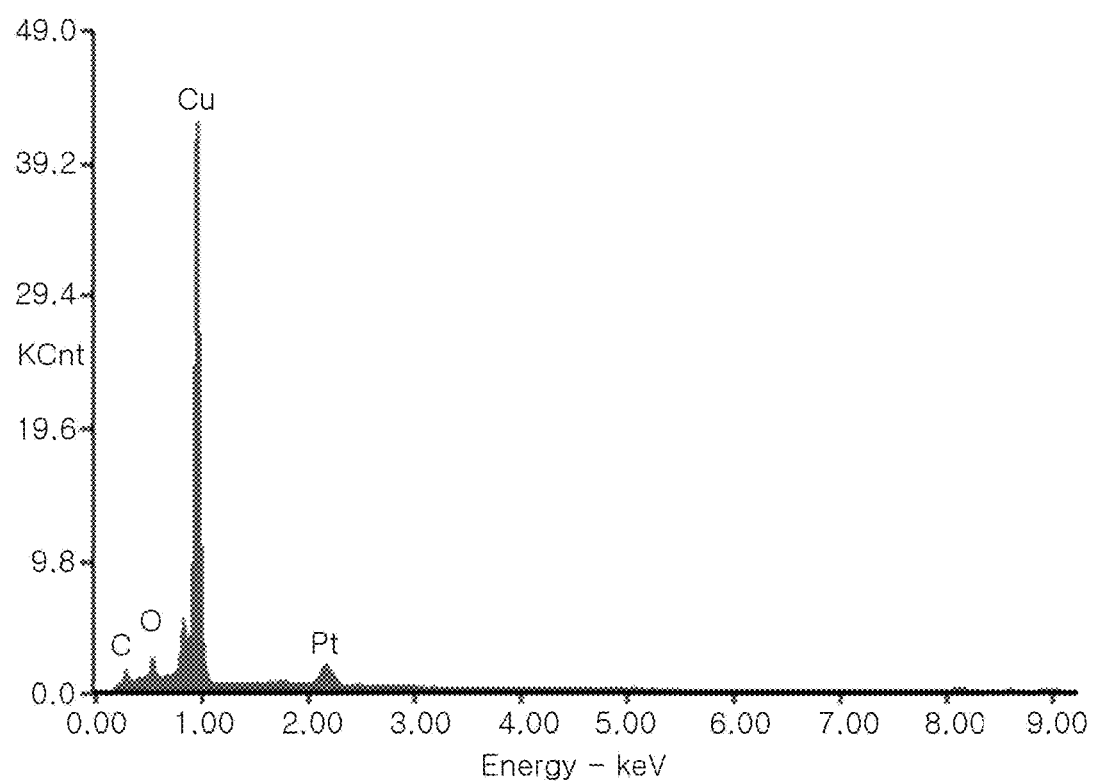
FIG. 8B is a result of SEM-EDS analysis of region of an external electrode including conductive particles, on which an Si—Al coating layer is not formed, and the region does not include glass.

Referring to FIGS. 7A to 8B, FIG. 7A is an SEM image of region (K) in FIG. 2, and FIG. 7B is an enlarged SEM image of a portion of region (T) illustrated in FIG. 7A. FIG. 8A is a result of SEM-EDS analysis of region (M) of an external electrode including plate-shaped Cu particles, on which an Si—Al coating layer is formed, shown in FIG. 7B, and the region does not include glass, and FIG. 8B is a result of SEM-EDS analysis of region of an external electrode including conductive particles, on which an Si—Al coating layer is not formed, and the region does not include glass. According to this, it is indicated that, even when a heat treatment process was performed on the multilayer electronic component having a size of 0402 at 700° C. to 750° C., the Si coating layer 141b remained on the plate-shaped conductive particles 141a in the external electrode.

Figure 9A:
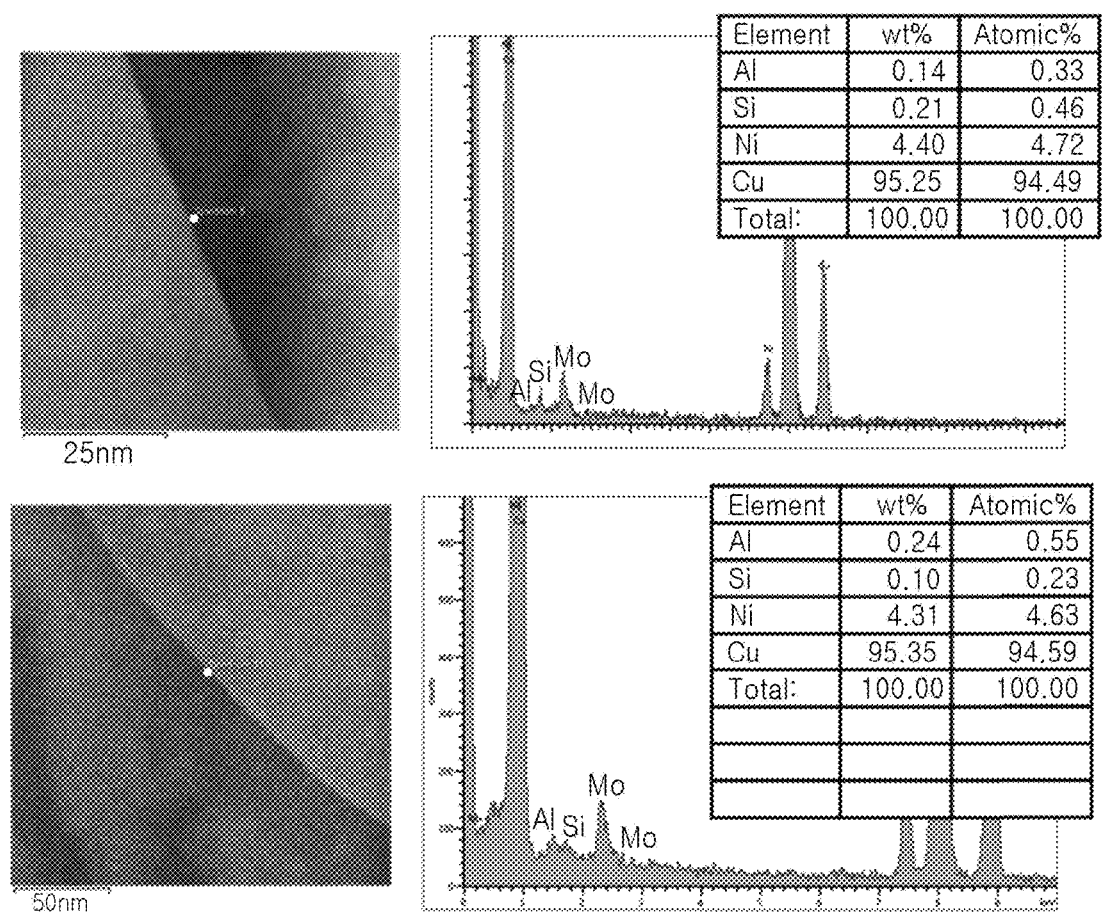
FIG. 9A is a TEM-EDS image and analysis result at a Cu—Cu particle interfacial surface on which an Si—Al coating layer is formed in an external electrode.
Figure 9B:
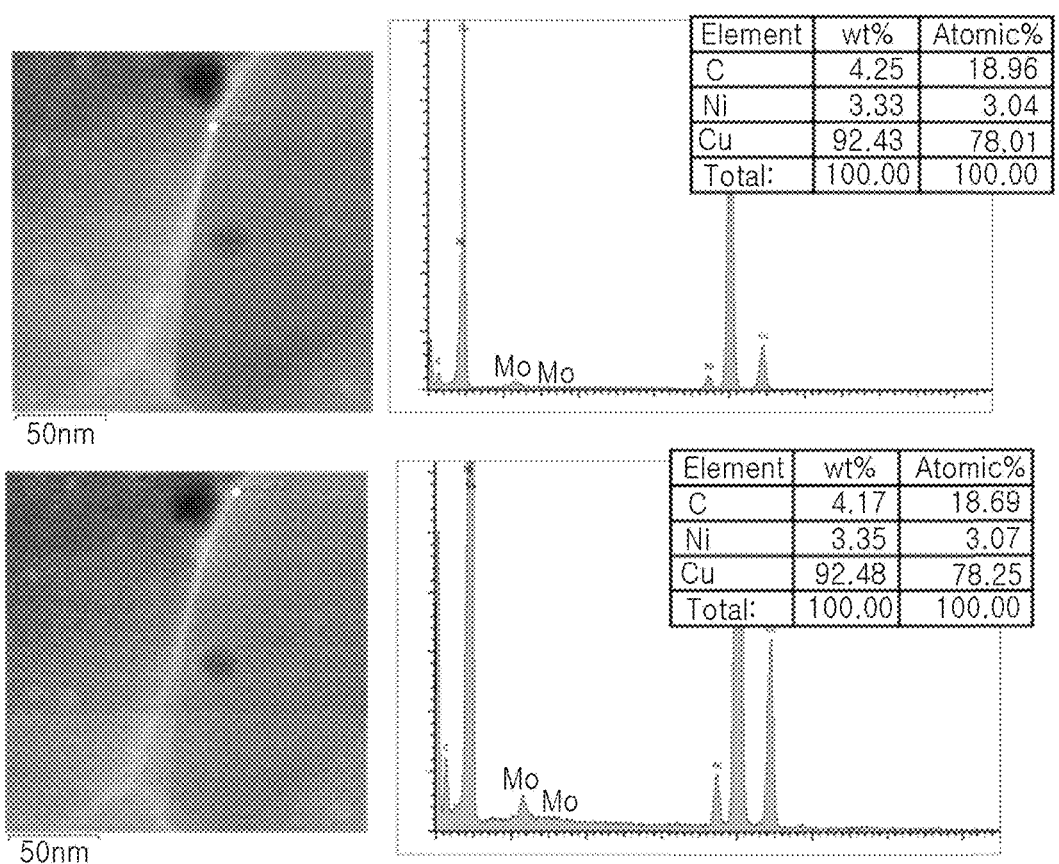
FIG. 9B is a TEM-EDS image and analysis result at a Cu—Cu particle interfacial surface on which an Si—Al coating layer is not formed in an external electrode.

Meanwhile, FIG. 9A is a transmission electron microscope-energy dispersive X-ray spectroscopy (TEM-EDS) image and analysis result at a Cu—Cu particle interface on which an Si—Al coating layer is formed in an external electrode, and it is indicated that Si and Al elements were included even after the heat treatment process. FIG. 9B is a TEM-EDS image and analysis result at a Cu—Cu particle interface on which an Si—Al coating layer is not formed in an external electrode, and it is indicated that Si and Al elements were not included.

The external electrodes 131 and 132 may include electrode layers 131a and 132a disposed on the body 110.

For example, the electrode layers 131a and 132a may be fired electrodes including a conductive metal and glass, or resin-based electrodes including a conductive metal and a base resin. Also, the electrode layers 131a and 132a may be in a form in which a sintered electrode and a resin-based electrode are formed in order on the body 110. Also, the electrode layers 131a and 132a may be formed by transferring a sheet including a conductive metal to the body 110 or by transferring a sheet including a conductive metal to the firing electrode.

The glass may improve adhesion properties and moisture resistance of the external electrodes 131 and 132. That is, adhesion between the electrode layers 131a and 132a of the external electrode and the dielectric layer 111 of the body 110 may be maintained by a glass component.

The glass may have a composition in which oxides are mixed, and may be one or more selected from a group consisting of silicon oxide, boron oxide, aluminum oxide, transition metal oxide, alkali metal oxide and alkaline earth metal oxide, but an example embodiment thereof is not limited thereto.

In an example embodiment, the reduction rate of the sintering reduction may be reduced, such that the corner thickness of the external electrode may be thin, and the coverage of the chip, which may be an effect. This may be obtained by reducing the reduction rate by preventing necking or agglomeration by coating the conductive particles for external electrodes with the coating layer 141b and delaying sintering. Also, since the thickness of the corner portion C of the external electrodes is relatively thin as compared to the thickness of the band portion B and the connection portion A, the corner coverage may be relatively weak. However, the corner coverage may improve through the effect of reduction rate due to the delay in sintering, thereby preventing breakage of electrodes or plating. Accordingly, permeation of moisture or a plating solution may be prevented, or moisture-resistance reliability may improve, thereby improving reliability of the multilayer electronic component.

The external electrodes 131 and 132 of the multilayer electronic component 100 may be manufactured using a paste including conductive particles, and generally, the paste for the external electrodes 131 and 132 may be prepared by mixing conductive particles, glass, a base resin, and an organic material.

In the example embodiments, the chip coverage may refer to the thickness of the external electrodes 131 and 132. More specifically, the chip coverage may refer to the thickness D1 of the band portion B, the connection portion A, and the corner portion C connecting the band portion B to the connection portion A and disposed at the corner. Accordingly, when the external electrodes 131 and 132 having a predetermined thickness or more are formed, the body 110 may not be exposed at the corner portion C of the multilayer electronic component 100 and the electrode or plating may not be broken.

In the example embodiments, the plating coverage may refer to the thickness of the plating layers 131b and 132b manufactured by forming a plating solution on the electrode layers 131a and 132a. When the plating coverage is good, the plating breakage may not occur.

In an example embodiment, the external electrodes 131 and 132 may include the band portions B disposed on the first and second surfaces 1 and 2, the connection portions A disposed on the third and fourth surfaces 3 and 4, and the corner portions C connecting the band portions B to the connection portions A and disposed at the corner connecting the first and second surfaces 1 and 2 to the third and fourth surfaces 3 and 4, and the thickness D1 of the corner portion may be 0.1 μm or more and 10 μm or less.

More specifically, the first external electrode 131 may be disposed to cover the third surface 3 and a portion of the first, second, fifth, and sixth surfaces 1, 2, 5, and 6 of the body 110. That is, the first external electrode 131 may include a connection portion A disposed on the third surface 3 of the body 110 and a band portion B extending from the connection portion A to a portion of the first, second, fifth and sixth surfaces 1, 2, 5, and 6.

Similarly, the second external electrode 132 may be disposed to cover the fourth surface 4 and a portion of the first, second, fifth, and sixth surfaces 1, 2, 5, and 6 of the body 110. In greater detail, the second external electrode 132 may include a connection portion A disposed on the fourth surface 4 of the body 110 and a band portion B extending from the connection portion A to a portion of the first, second, fifth and sixth surfaces 1, 2, 5, and 6.

Referring to FIG. 2, when defining an arbitrary angle increasing in the first direction linear line with respect to the second direction linear line as θ (0°<θ<90°) between the linear line in the second direction connecting the boundary at which the connecting portion A and the corner portion C meet, and the linear line in the first direction connecting the boundary at which the band portion B and the corner portion C meet in cross-sections in the first and second directions of the multilayer electronic component 100, at one point at which a linear line having an arbitrary angle θ and the body 110 meet, the thickness D1 of the corner in a direction perpendicular to the tangent of the body 110 may be 0.1 μm or more and 10 μm or less.

When the thickness D1 of the corner portion is less than 0.1 μm, the corner coverage may be thin such that the external electrodes 131 and 132 may be broken by a physical impact, and accordingly, the body 110 may be exposed. Also, when the plating layers 131b and 132b are formed, glass of the external electrodes 131 and 132 may be melted by the plating solution, such that the electrode or plating may be partially broken. When the thickness D1 of the corner portion is more than 10 μm, ultra-thin thickness of the external electrodes 131 and 132 may not be obtained, and miniaturization and high capacitance of the multilayer electronic component 100 may not be obtained. D1 may be measured using an electron microscope. Other methods and/or tools appreciated by one of ordinary skill in the art, even if not described in the present disclosure, may also be used.

In an example embodiment, the average thickness D2 of the connection portion may be 5 μm or more and 20 μm or less.

The average thickness D2 of the connection portion may be an average value of thicknesses measured at five points spaced apart by an equal distance on the third surface 3 or the fourth surface 4. As a specific example, the average thickness D2 may be an average value of a center point in the first direction, two points spaced apart by 5 μm in the first direction with respect to the center point in the first direction, and two points spaced apart by 10 μm in the first direction. D2 may be measured using an electron microscope. Other methods and/or tools appreciated by one of ordinary skill in the art, even if not described in the present disclosure, may also be used.

Meanwhile, when the paste for the external electrodes 131 and 132 is applied or a dipping process is used, the average thickness D2 of the connection portion may be greater than the thickness D1 of the corner portion, but an example embodiment thereof is not limited thereto.

In an example embodiment, the plurality of conductive particles may further include second conductive particles 142, and the second conductive particles 142 may include spherical conductive particles, and the spherical conductive particles may be one or more selected from a group consisting of copper (Cu), silver (Ag), nickel (Ni), and alloys thereof.

Different from the first conductive particles 141 on which the coating layer 141b is applied, the second conductive particles 142 may not have a coating layer 141b. Accordingly, sintering reduction may occur during the heat treatment process and the gap between the first conductive particles 141 may be filled. That is, by lowering porosity of the electrode layers 131a and 132a, electrical connectivity in the external electrodes 131 and 132 may improve. However, if desired, the second conductive particles 142 may be formed by forming a coating layer 141b on the surface of the spherical conductive particles, and the sintering reduction control may be obtained by the second conductive particles 142.

In an example embodiment, the average major axis diameter of the spherical conductive particles may be 0.01 μm or more and 10 μm or less, and the ratio of the major axis diameter to the minor axis diameter (major axis diameter/minor axis diameter) may be 1.5 or less.

That is, the spherical conductive particles may not include only conductive particles having an exact spherical shape, but may include an incomplete spherical shape occurring during a manufacturing process.

In an example embodiment, in the first and second direction cross-sections of the body 110, the area ratio of the first conductive particles 141 in the external electrodes 131 and 132 may be 30% or greater or 80% or less.

The above area ratio may refer to an area ratio of a corresponding component to a total volume of a specific component, and may refer to an average area ratio.

Specifically, the area ratio occupied by the first conductive particles 141 may refer to an area ratio occupied by the first conductive particles 141 in the external electrodes 131 and 132 in the cross-sections of the body 110 in the first and second direction.

In this case, there may be various methods of measuring the area ratio of one component, and a method of calculating an arithmetic average by measuring the area ratio of the corresponding component in the cross-section of the multilayer electronic component 100 may be used.

For example, the area ratio of the first conductive particles 141 included in the external electrodes 131 and 132 may refer to an arithmetic average of the area ratio occupied by the first conductive particles 141 to the total area of the regions in which the external electrodes 131 and 132 are disposed in the cross-sectional surface by cutting the multilayer electronic component 100 into 5 equal regions in a direction parallel to the cross-section of the body 110 in the second and third direction. The cross-section of the body 110 may be observed using an electron microscope. Other methods and/or tools appreciated by one of ordinary skill in the art, even if not described in the present disclosure, may also be used.

When the area ratio occupied by the first conductive particles 141 in the external electrodes 131 and 132 is less than 30%, the sintering delay effect, the corner coverage and the plating coverage may be insufficient as described above. When the area ratio occupied by the first conductive particles 141 in the external electrodes 131 and 132 is more than 80%, the plate-shaped conductive particles 141a may be excessively included, such that the filling ratio of the corners may rather be decreased, and the corner coverage may be insufficient or there may be an issue in electrical connectivity of the second external electrodes 131 and 132.

In an example embodiment, the external electrodes 131 and 132 may further include plating layers 131b and 132b covering the plurality of conductive particles.

The plating layers 131b and 132b may improve mounting properties. The plating layers 131b and 132b may be formed by sputtering or electrolytic plating, but an example embodiment thereof is not limited thereto. The type of the plating layer is not limited to any particular example, and a plating layer including at least one of nickel (Ni), copper (Cu), tin (Sn), palladium (Pd), platinum (Pt), gold (Au), silver (Ag), lead (Pb), and alloys thereof, and a plurality of layers may be formed. As a more specific example of the plating layer, the plating layer may be a Ni or Sn plating layer, and a Ni plating layer and a Sn plating layer may be formed in order on the electrode layers 131a and 132a, or a Sn plating layer, a Ni plating layer, and a Pd plating layer may be formed in order. Further, the plating layer may include a plurality of Ni plating layers and/or a plurality of Sn plating layers. By including the plating layer, mounting properties with a substrate, structural reliability, external durability, heat resistance, and/or equivalent series resistance (ESR) may improve.

In the multilayer electronic component 100 having the external electrodes 131 and 132 disposed to cover a portion of the third and fourth surfaces 3 and 4 and a portion of the first, second, fifth and sixth surfaces 1, 2, 5, and 6 of the body 110, most of the erosion of the external electrodes 131 and 132 by the plating solution may occur at each corner of the third and fourth surfaces 3 and 4 of the body 110, which may be problematic.

The size of the multilayer electronic component 100 described in the example embodiments is not limited to any particular example. However, to simultaneously implement miniaturization and high capacitance, the thickness of the dielectric layer 111 and the internal electrodes 121 and 122 may need be increased to increase the number of laminated layers, such that the effect of reliability improvements may be significant in the multilayer electronic component 100 having a size of 0402 (length×width, 0.4 mm×0.2 mm) or less.

Method of Manufacturing Multilayer Electronic Component

Hereinafter, the description of the multilayer electronic component 100 will not be provided as it is the same as described above.

In the description below, a method of manufacturing the multilayer electronic component 100 will be described in detail, but an example embodiment thereof is not limited thereto, and overlapping descriptions will not be provided. Also, in an example embodiment, a method of manufacturing the multilayer electronic component 100 will be described as an example, but an example embodiment thereof is not limited thereto, and the method may be applied to a method of manufacturing the multilayer electronic component 100 including a body 110 including the plurality of dielectric layers 111 and the internal electrodes 121 and 122 and external electrodes 131 and 132.

In another example embodiment, a method of manufacturing a multilayer electronic component 100 may include preparing a body including a plurality of dielectric layers and internal electrodes disposed to oppose each other with the dielectric layers interposed therebetween and preparing an external electrode connected to the internal electrode and including a plurality of conductive particles, wherein the plurality of conductive particles include first conductive particles, the first conductive particles are plate-shaped conductive particles having a Si—Al coating layer formed on a surface thereof, and are at least one selected from a group consisting of copper (Cu), silver (Ag), nickel (Ni), and alloys thereof, and a Si content of the coating layer is 0.3 at % or more and 2.0 at % or less, as compared to the plate-shaped conductive particles after the preparing the external electrode.

In the preparing the body 110, a plurality of ceramic green sheets may be prepared by applying and coating a slurry formed including powder such as barium titanate ($BaTiO_3$) on a carrier film and dried, thereby forming the dielectric layer 111.

The ceramic green sheet may be prepared by preparing a slurry by mixing ceramic powder, a binder, and a solvent, and forming the slurry in a form of a sheet having a thickness of several μm by a doctor blade method.

In the description below, a paste for the internal electrodes 121 and 122 including nickel (Ni) powder may be prepared.

The internal electrodes 121 and 122 may be formed by applying the paste for the internal electrodes 121 and 122 on the green sheet by a screen printing method, a plurality of green sheets on which the internal electrodes 121 and 122 are printed may be laminated, a plurality of green sheets on which the internal electrodes 121 and 122 are not printed may be laminated on the upper and lower surfaces of the laminate and may be fired, thereby forming the body 110.

The body 110 may include a dielectric layer 111 and internal electrodes 121 and 122, and the dielectric layer 111 may be formed by firing a green sheet on which the internal electrodes 121 and 122 are printed.

The internal electrodes 121 and 122 may be formed as a first internal electrode 121 and a second internal electrode 122.

In the preparing the external electrodes 131 and 132, the electrode layers 131a and 132a connected to the internal electrodes 121 and 122 and including a plurality of conductive particles may be formed.

The plurality of conductive particles may include first conductive particles 141, and the first conductive particle 141 may be a plate-shaped conductive particle 141a having a Si—Al coating layer formed on a surface thereof, may be one or more selected from a group consisting of copper (Cu), silver (Ag), nickel (Ni), and alloys thereof, and after the preparing the external electrodes 131 and 132, the Si content of the coating layer is 0.3 at % or more and 2.0 at % or less, as compared to the plate-shaped conductive particles.

The first conductive particles 141 may be formed by dispersing the plate-shaped conductive particles 141a in a solvent, adding the Si coating agent in an amount of 1 wt % or more and 8 wt % or less, as compared to the plate-shaped conductive particles 141a, and performing coating. Thereafter, the first conductive particles 141 may be dried, and the dried first conductive particles 141 may be added when the paste for the external electrodes 131 and 132 is prepared. In this case, the Si coating agent may further include Al.

In the electrode layers 131a and 132a, first and second electrode layers 131a and 132a may be formed on the external surface of the body 110 to be connected to the first and second internal electrodes 121 and 122. The first and second electrode layers 131a and 132a may be formed by firing a paste including a conductive metal and glass.

In an example embodiment, the preparing the external electrodes 131 and 132 may include a heat treatment process, and the reduction rate of the first conductive particles 141 may be 10% or less during the heat treatment process. The reduction rate may be measured using the methods associated with the examples in the present disclosure. Other methods and/or tools appreciated by one of ordinary skill in the art, even if not described in the present disclosure, may also be used.

In an example embodiment, the body 110 may include first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction. The external electrodes 131 and 132 may include band portions B disposed on the first and second surfaces 1 and 2, connection portions A disposed on the third and fourth surfaces 3 and 4, and corner portions C connecting the band portions B to the connection portions A and disposed at the corner connecting the first and second surfaces 1 and 2 to the third and fourth surfaces 3 and 4, and the thickness D1 of the corner portion may be 0.1 μm or more and 10 μm or less.

In an example embodiment, the average thickness of the connection portion may be 5 μm or more and 20 μm or less.

Hereinafter, the present disclosure will be described in greater detail through experimental examples to help understanding of the present disclosure, and the scope of the present disclosure is not limited to the experimental examples.

Experimental Example

Evaluation of reduction (sintering delay), corner coverage, plating coverage and Si agglomeration of the plate-shaped Cu particles including a Si—Al coating layer formed thereon was performed, and a detailed measurement method or evaluation method thereof will be described in greater detail with reference to FIGS. 10 to 14.

Figure 10:
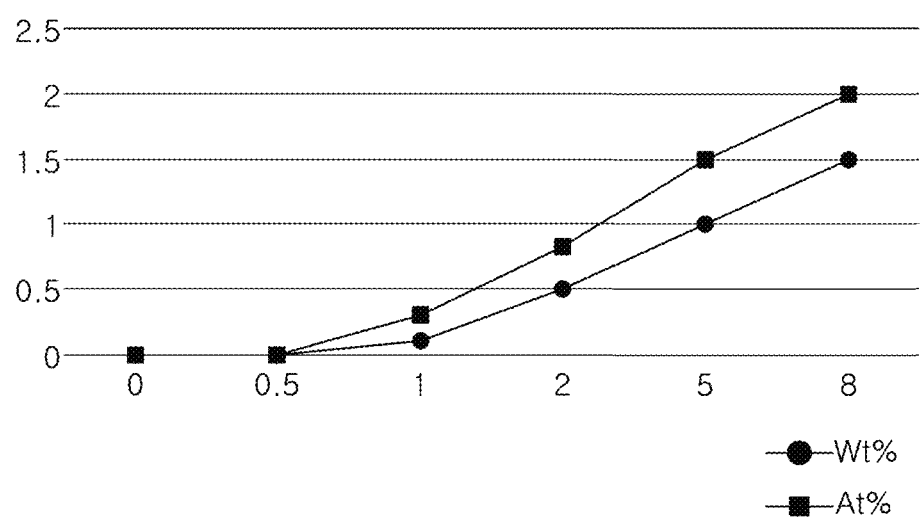
FIG. 10 is a graph illustrating an Si content (vertical axis: wt %, at %) after a heat treatment process versus a Si content (horizontal axis: wt %) before a heat treatment process.

The horizontal axis of the graph illustrated in FIG. 10 indicates the Si content (wt %) included in the Si—Al coating layer before heat treatment, and the vertical axis indicates the Si content (wt %, at %) remaining in the Si—Al coating layer after heat treatment. Accordingly, the specific numerical values of the Si content included in the Si—Al coating layer before and after the heat treatment may be confirmed in Table 1, and unless otherwise indicated, the Si content may be applied in the same numerical value in Tables 2 to 4 as well.

First, Table 1 below lists the reduction rate data according to the Si content. Here, the reduction rate may refer to a sintering delay effect. In this case, when the reduction rate is 10% or less, it was evaluated that there was a sintering delay effect, and the detailed method of preparing a sample and a measurement method are as below.

First, a paste was prepared by mixing copper powder (Cu powder):binder (binder):solvent (solvent) at 100:6.5:3.5 by parts by weight. The copper powder includes copper particles coated with Si according to the Si content in Table 1. The mixture including copper powder, binder, solvent was roll-dispersed over 10 times under a pressure condition of 10 bars in a three roll mill device. Here, the three roll mill may be a device for grinding, mixing and dispersing a paste material passing through a roller gap using three rollers using shear force created from a difference between the pressure of the roller and the rotation ratio of the roller.

The paste was thinly casted on a silicone release film to a level of 100 μm and was dried in a drying oven at 80° C. temperature condition for 2 hours or more and a solvent was removed. Here, the silicone release film may be used for protecting the paste, and may have a function of being easily peelable from the paste.

The dried Cu sheet was peeled from the film and was ground using a mortar to form powder.

The powder was put in a press holder and was pressurized to form a pellet, and the volume V1 was calculated by measuring the diameter, height, and size.

Thereafter, a heat treatment was performed at a temperature of 730° C. for 70 minutes, and the volume V2 was calculated by measuring the diameter, height, and size.

Finally, the volume change rate (($(V1-V2)/V1)\times100\%$) was calculated and the reduction rate was listed in Table 1 below.

TABLE 1

| Si content before heat treatment (wt %) | 0 | 0.5 | 1.0 | 2.0 | 5.0 | 8.0 |
|---|---|---|---|---|---|---|
| Si content after heat treatment (wt %) | 0 | 0 | 0.1 | 0.5 | 1 | 1.5 |
| Si content after heat treatment (at %) | 0 | 0 | 0.3 | 0.83 | 1.5 | 2.0 |
| Reduction rate (%) | 40.76 | 21.88 | 9.52 | 5.29 | 4.92 | 4.00 |

Figure 11:
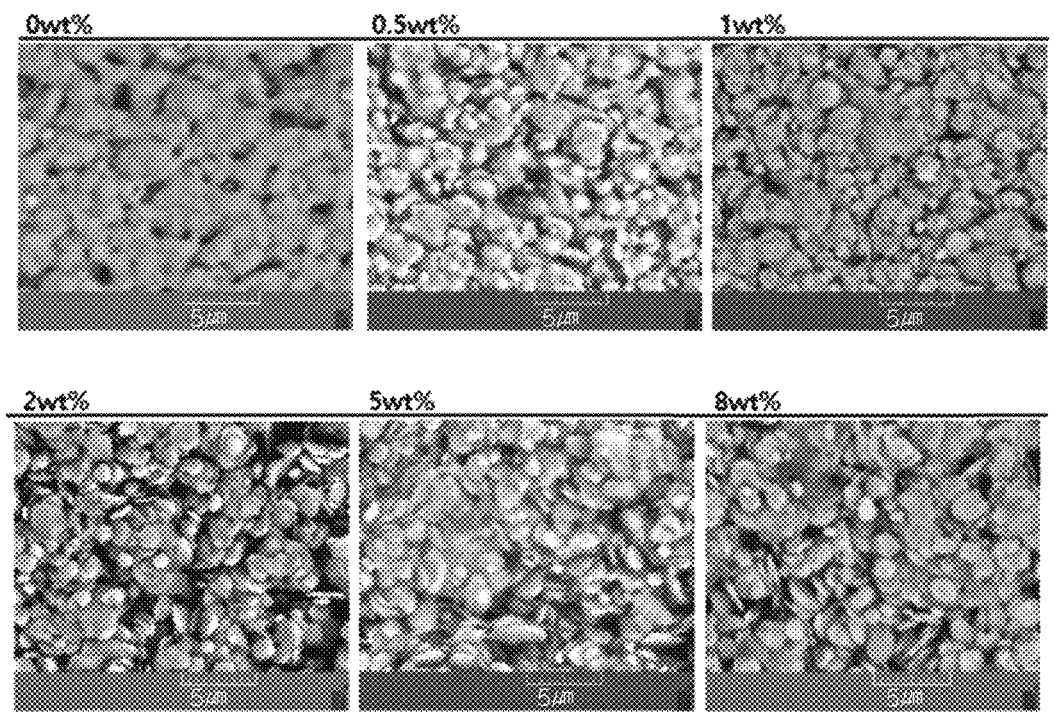
FIG. 11 is an SEM image of plate-shaped Cu particles, on which a coating layer was formed by varying a Si content, after a heat treatment has been performed to the particles.

FIG. 11 is an SEM image of plate-shaped Cu particles, on which a coating layer was formed by varying a Si content with respect to the content before heat treatment, obtained after a heat treatment has been performed on the particles at 730° C. for 70 minutes.

Referring to FIG. 11 and Table 1, when Si was included in the coating layer at 0.3 at % or more with respect to the content after heat treatment (corresponding to 1 wt % or more before heat treatment as shown in FIG. 11), it is confirmed that the reduction rate was 10% or less, and that the sintering delay effect was obtained. Also, when the Si content was 0.83 at % or more (corresponding to 2 wt % or more before heat treatment as shown in FIG. 11), necking did not occur between Cu particles. When the Si content was less than 0.3 at % (corresponding to less than 1 wt % before heat treatment as shown in FIG. 11), the reduction occurred excessively, such that the sintering delay effect was insignificant, and accordingly, corner coverage and plating coverage were insufficient.

Table 2 below lists data on corner coverage according to an Si content. In this case, when density is 85% or more, the plating coverage was evaluated as excellent, and the detailed evaluation method is as below.

Figure 12:
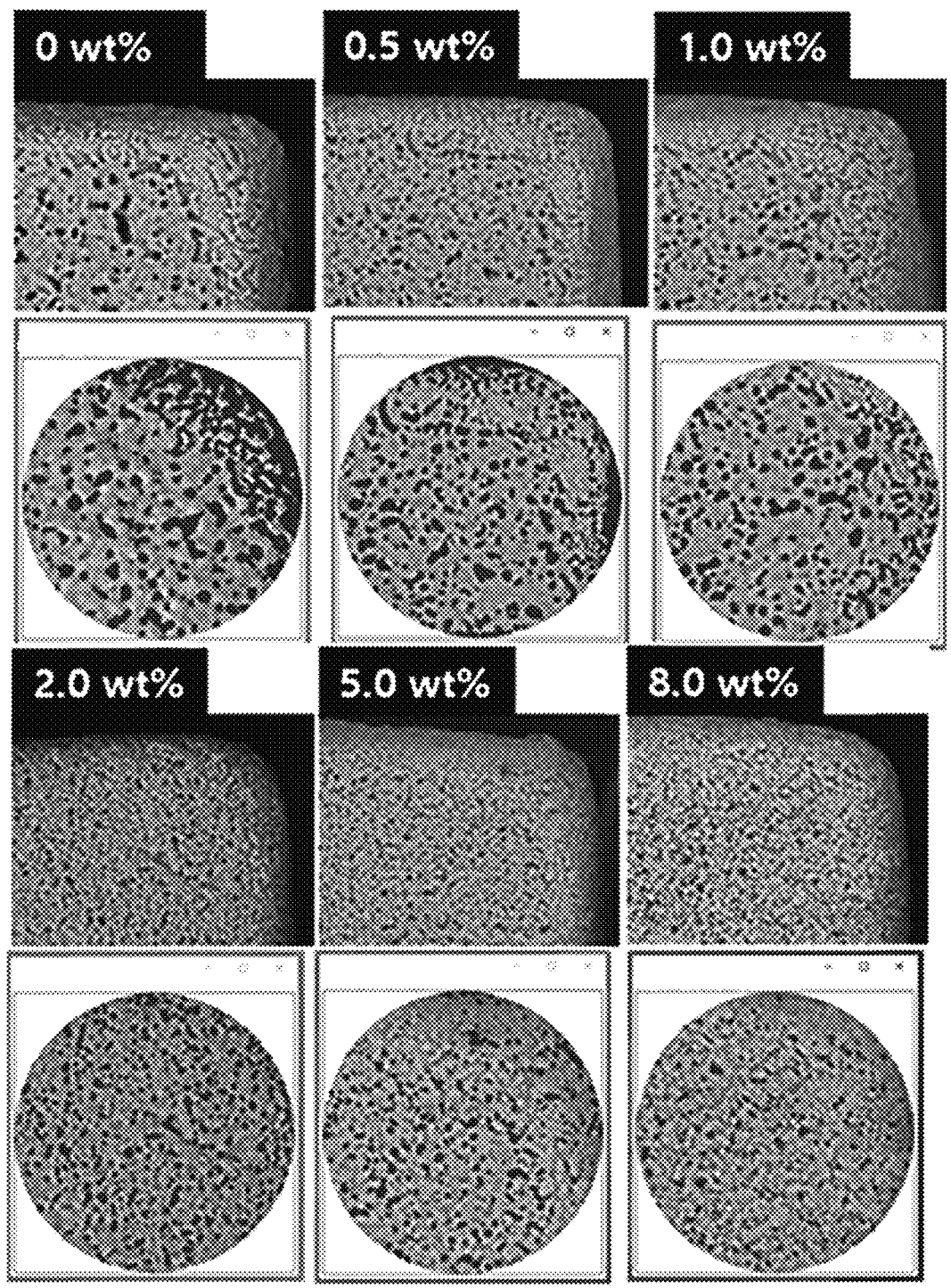
FIG. 12 is an image of analysis of density of an external electrode, in which a coating layer is formed by varying a Si content, using Image J.

Referring to FIG. 12, the coverage of one corner of the external electrode was quantified as in Table 2 below using the imaging analysis tool of the Image J program. Here, the Image J program performs image processing on a digital image composed of pixels, and porosity may be analyzed by analyzing the pixels of the digital images, and this was numerically represented as a degree of density.

TABLE 2

| Si content before heat treatment (wt %) | 0 | 0.5 | 1.0 | 2.0 | 5.0 | 8.0 |
|---|---|---|---|---|---|---|
| Density (%) | 79.34 | 84.24 | 87.11 | 90.96 | 93.06 | 97.00 |

Referring to FIG. 12 and Table 2, it is confirmed that the density was 85% or more when 0.3 at % or more of Si was included in the coating layer with respect to the content after heat treatment (corresponding to 1 wt % or more before heat treatment as shown in FIG. 12). When the Si content was less than 0.3 at %, an external electrode breakage occurred due to insufficient corner coverage, or reliability of the multilayer electronic component was deteriorated as the body was exposed.

Table 3 below list data on plating coverage according to an Si content. In this case, when the defective rate of the plating coverage was less than 31%, the plating coverage was evaluated as good, and the detailed evaluation method is as below.

Figure 13A:
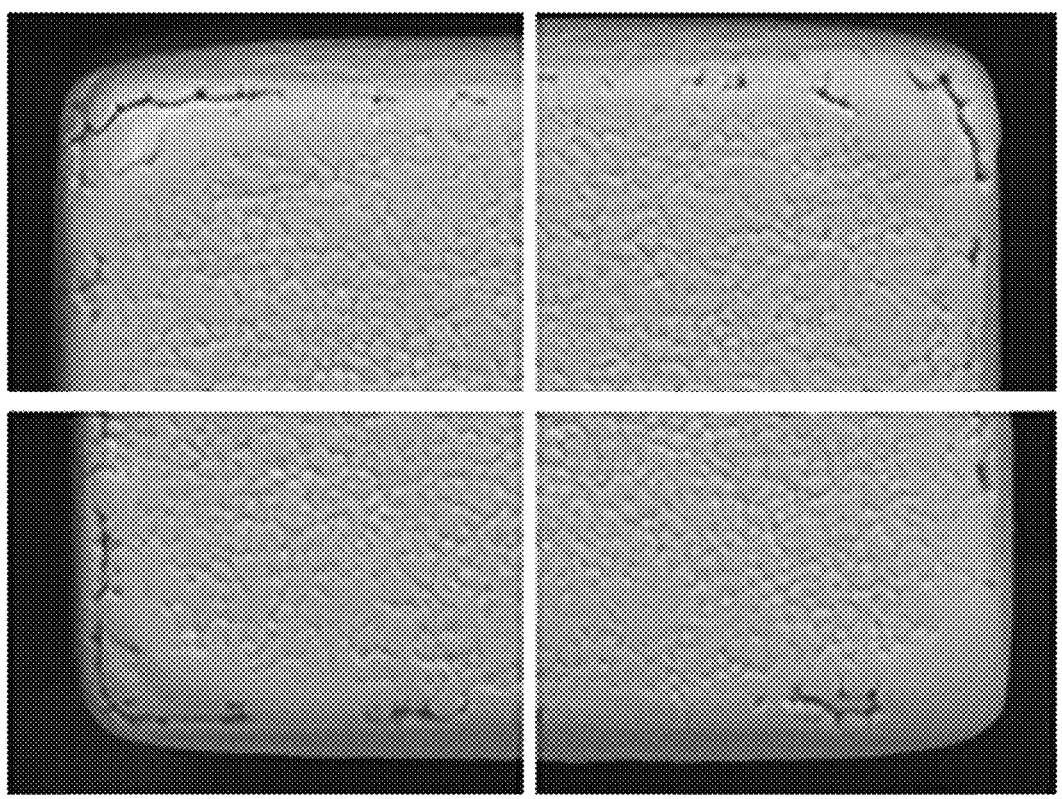
FIG. 13A is an SEM image obtained by dividing one cross-section of an external electrode, on which a coating layer is not formed, into 4 equal regions.
Figure 13B:
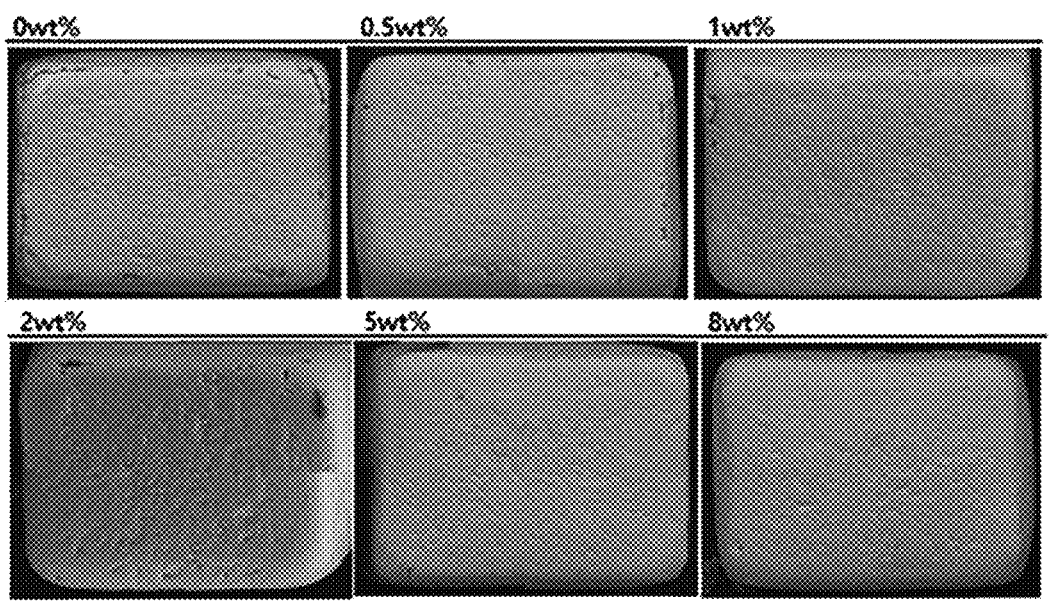
FIG. 13B is an SEM image of one cross-section of an external electrode when a Si content is varied with reference to a Si content before a heat treatment process.

Referring to FIGS. 13A and 13B, when the external electrode was viewed in the second direction on the planes taken in the first and third direction, the sample chip was divided into four equal regions, and it was observed whether there was a plating breakage in each region.

For example, FIG. 13A is an SEM image obtained by dividing one cross-section of an external electrode into 4 equal regions when the Si content was 0 wt % with respect to the content before a heat treatment. It was confirmed that plating breakage was observed in an entirety of the four regions.

The plating coverage was evaluated for 9 sample chips in the same manner, and the relevant data are listed in Table 3 below. That is, the 9 sample chips were divided into 4 regions, and the total number of plating breakage was observed, which was represented as the number of defectives (the number of areas with broken plating/36) and the defective rate ((number of areas with broken plating/36)× 100%).

TABLE 3

| Si content before heat treatment (wt %) | 0 | 0.5 | 1.0 | 2.0 | 5.0 | 8.0 |
|---|---|---|---|---|---|---|
| Number of defectives (pcs) | 36/36 | 25/36 | 21/36 | 10/36 | 11/36 | 6/36 |
| Defective rate (%) | 100 | 69.4 | 58.3 | 27.8 | 30.6 | 16.7 |

Referring to FIG. 13B and Table 3, it is indicated that the defective rate was less than 31% when Si was included in the coating layer by 0.83 at % or more with respect to the content after heat treatment (corresponding to 2 wt % or more before heat treatment as shown in FIG. 13B), whereas, when the Si content was less than 0.3 at % (corresponding to less than 1 wt % before heat treatment as shown in FIG. 13B), the defective rate was 58.3% or more, which may indicate that, as plating coverage was insufficient such that plating breakage occurred frequently, and accordingly, reliability of the multilayer electronic component may be degraded.

Table 4 below lists data obtained by mapping Electron Probe Micro-Analyzer (EPMA/EDS) according to the Si content, and the data value is a data value of the area percentage obtained through surface analysis. That is, to identify the relative area ratio of one element in the sample, the area in which the element to be measured is distributed was measured. Here, when the Si area percentage according to the EPMA/EDS analysis result exceeded 4%, it was evaluated that dispersibility of Cu particles in the paste may be deteriorated.

TABLE 4

| | Si content before heat treatment (wt %) | | | | |
|---|---|---|---|---|---|
| | 0 | 1.0 | 2.0 | 5.0 | 8.0 |
| Type of elements | Area percentage of elements | | | | |
| Al (%) | 0.0316 | 0.1013 | 0.1069 | 0.5873 | 0.9570 |
| O (%) | 2.2390 | 4.0596 | 4.6939 | 11.3456 | 16.5246 |
| Si (%) | 0.1902 | 0.5201 | 0.6847 | 2.4855 | 4.0116 |
| Cu (%) | 97.5391 | 95.3189 | 94.5146 | 85.5816 | 78.5068 |
| Total (%) | 100 | 100 | 100 | 100 | 100 |

Figure 14:
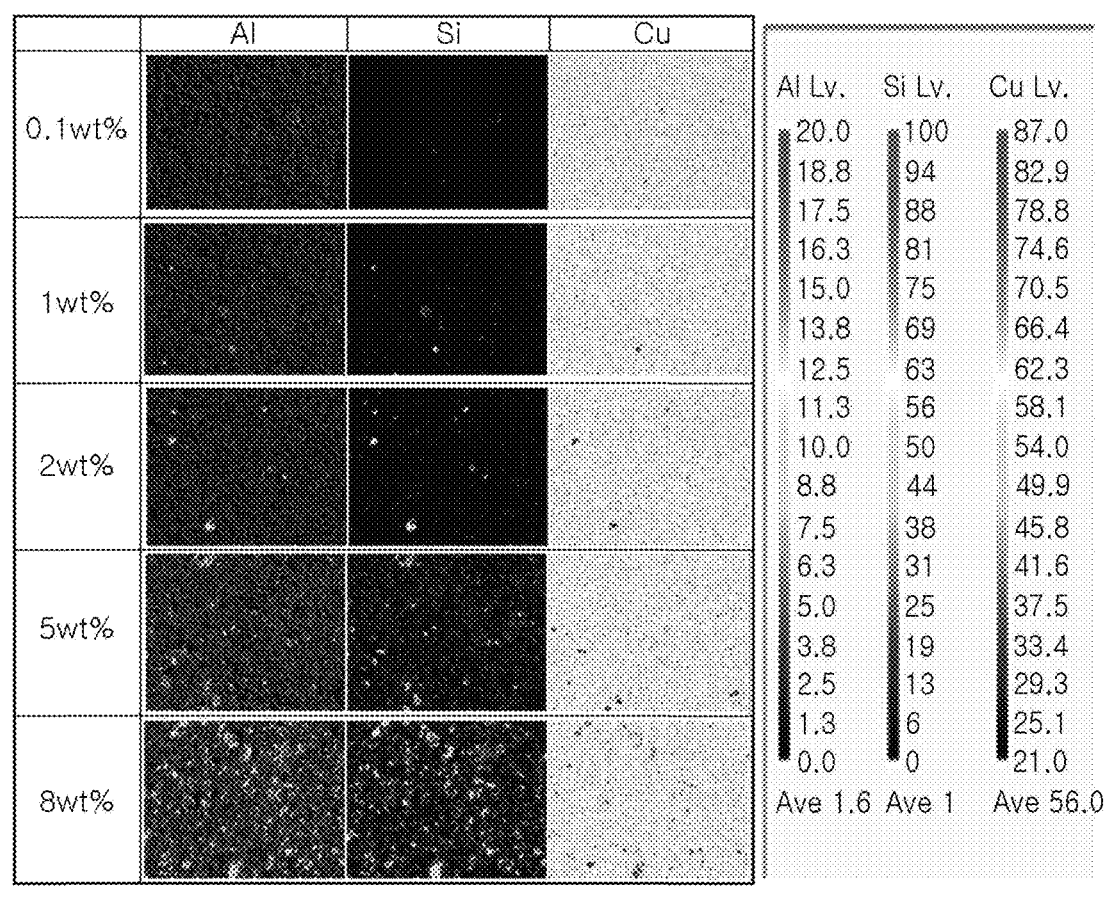

Referring to FIG. 14 and Table 4, when Si is included in the coating layer in excess of 2.0 at % with respect to the content after heat treatment (corresponding to more than 8 wt % before heat treatment), Si agglomeration occurred frequently, and accordingly, dispersibility of Cu particles in the external electrode paste may be degraded.

According to the measurement evaluation method described above through the experimental example, when Si was present in the coating layer in an amount of 0.3 at % or more and 2.0 at % or less after heat treatment (corresponding to 1 wt % or more and 8 wt % or less before heat treatment), a portion or an entirety of the evaluation of sintering delay effect, corner coverage, plating coverage, and Si agglomeration exhibited excellent results. For example, FIG. 14 shows that there is a little Si agglomeration when Si is included in the coating layer at 8 wt % before heat treatment.

According to the aforementioned example embodiments, by controlling the thickness of the external electrode by controlling the sintering reduction of the plurality of conductive particles, the thickness of the external electrode may be reduced and the corner coverage may be improved, such that the corner peeling or plating breakage after plating may be prevented, thereby improving reliability of the multilayer electronic component.

While the example embodiments have been illustrated and described above, it will be configured as apparent to those skilled in the art that modifications and variations could be made without departing from the scope of the present disclosure as defined by the appended claims.

What is claimed is:
1. A multilayer electronic component, comprising:
   a body including:
      a plurality of dielectric layers, and
      internal electrodes disposed to oppose each other with the dielectric layers interposed therebetween; and
   external electrodes connected to the internal electrodes and including a plurality of conductive particles,
      wherein the plurality of conductive particles include first conductive particles, wherein the first conductive particles are plate-shaped conductive particles having a coating layer disposed on a surface thereof, wherein the coating layer includes Si, and an Si content is 0.3 at % or more and 2.0 at % or less, as compared to the plate-shaped conductive particles, and wherein an average thickness of the coating layer is 15 nm or more and 60 nm or less.

2. The multilayer electronic component of claim 1, wherein the body includes first and second surfaces opposing each other in a first direction, third and fourth surfaces connected to the first and second surfaces and opposing each other in a second direction, and fifth and sixth surfaces connected to the first to fourth surfaces and opposing each other in a third direction, and wherein the external electrodes include band portions disposed on the first and second surfaces, connection portions disposed on the third and fourth surfaces, and corner portions connecting the band portions to the connecting portions and disposed at corners connecting the first and second surfaces to the third and fourth surfaces, and wherein a thickness of the corner portion is 0.1 μm or more and 10 μm or less.

3. The multilayer electronic component of claim 2, wherein an average thickness of the connection portions is 5 μm or more and 20 μm or less.

4. The multilayer electronic component of claim 2, wherein the coating layer further includes Al.

5. The multilayer electronic component of claim 2, wherein an area ratio of the first conductive particles in the external electrodes is 30% or more and 80% or less in a cross-section of the external electrodes taken in the first and second directions.

6. The multilayer electronic component of claim 1, wherein an average major axis diameter of the plate-shaped conductive particles is 0.1 μm or more and 10 μm or less, and a length ratio (major axis diameter/minor axis diameter) between a major axis diameter and a minor axis diameter is 2.0 or more.

7. The multilayer electronic component of claim 1, wherein the plate-shaped conductive particles include one or more selected from a group consisting of copper (Cu), silver (Ag), nickel (Ni), and alloys thereof.

8. The multilayer electronic component of claim 1, wherein the plurality of conductive particles further include second conductive particles, wherein the second conductive particles include spherical conductive particles, and wherein the spherical conductive particles include one or more selected from a group consisting of copper (Cu), silver (Ag), nickel (Ni), and alloys thereof.

9. The multilayer electronic component of claim 8, wherein an average major axis diameter of the spherical conductive particles is 0.01 μm or more and 10 μm or less, and a length ratio between a major axis diameter to a minor axis diameter (major axis diameter/minor axis diameter) is 1.5 or less.

10. The multilayer electronic component of claim 1, wherein at least one of the external electrodes further includes a plating layer covering the plurality of conductive particles.

11. The multilayer electronic component of claim 1, wherein the coating layer further includes Al, wherein the plurality of conductive particles further include second conductive particles, and wherein the second conductive particles are spherical conductive particles, and the plate-shaped conductive particles and the spherical conductive particles are each independently one or more selected from a group consisting of copper (Cu), silver (Ag), nickel (Ni), and alloys thereof.

12. The multilayer electronic component of claim 1, wherein the body includes first and second surfaces opposing each other in a first direction, third and fourth surfaces connected to the first and second surfaces and opposing each other in a second direction, and fifth and sixth surfaces connected to the first to fourth surfaces and opposing each other in a third direction, wherein the external electrodes include band portions disposed on the first and second surfaces, connection portions disposed on the third and fourth surfaces, and corner portions connecting the band portions to the connecting portions and disposed at corners connecting the first and second surfaces to the third and fourth surfaces, wherein a thickness of the corner portion is 0.1 μm or more and 10 μm or less, wherein an average major axis diameter of the plate-shaped conductive particles is 0.1 μm or more and 10 μm or less, and a length ratio (major axis diameter/minor axis diameter) between a major axis diameter and a minor axis diameter is 2.0 or more.

13. The multilayer electronic component of claim 12, wherein an average thickness of the connection portions is 5 μm or more and 20 μm or less, and wherein an area ratio of the first conductive particles in the external electrodes is 30% or more and 80% or less in a cross-section of the external electrodes taken in the first and second directions.

14. A multilayer electronic component, comprising:

a body including:

a plurality of dielectric layers, and internal electrodes disposed to oppose each other with the dielectric layers interposed therebetween; and external electrodes connected to the internal electrodes and including a plurality of conductive particles, wherein the plurality of conductive particles include first conductive particles, wherein the first conductive particles are plate-shaped conductive particles having a coating layer disposed on a surface thereof, wherein the coating layer includes Al and Si, wherein an Si content is 0.3 at % or more and 2.0 at % or less, as compared to the plate-shaped conductive particles, and wherein an average thickness of the coating layer is 15 nm or more and 60 nm or less.

15. The multilayer electronic component of claim 14, wherein the plate-shaped conductive particles include one or more selected from a group consisting of copper (Cu), silver (Ag), nickel (Ni), and alloys thereof.

16. The multilayer electronic component of claim 15, wherein the plate-shaped conductive particles include copper (Cu).

17. The multilayer electronic component of claim 14, wherein an average major axis diameter of the plate-shaped conductive particles is 0.1 μm or more and 10 μm or less.

18. The multilayer electronic component of claim 14, wherein a length ratio (major axis diameter/minor axis diameter) between a major axis diameter of the plate-shaped conductive particles and a minor axis diameter of the plate-shaped conductive particles is 2.0 or more.

* * * * *